United States Patent
Lang et al.

(10) Patent No.: US 10,908,896 B2
(45) Date of Patent: Feb. 2, 2021

(54) APPLICATION WRAPPING FOR APPLICATION MANAGEMENT FRAMEWORK

(71) Applicant: Citrix Systems, Inc., Fort Lauderdale, FL (US)

(72) Inventors: Zhongmin Lang, Parkland, FL (US); Gary Barton, Boca Raton, FL (US); James Robert Walker, Deerfield Beach, FL (US); Vipin Aravindakshan, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/876,832

(22) Filed: Oct. 7, 2015

(65) Prior Publication Data
US 2016/0026462 A1   Jan. 28, 2016

Related U.S. Application Data

(63) Continuation of application No. 14/055,078, filed on Oct. 16, 2013, now Pat. No. 9,170,800.
(Continued)

(51) Int. Cl.
*G06F 9/445* (2018.01)
*G06F 8/76* (2018.01)
(Continued)

(52) U.S. Cl.
CPC ............ *G06F 8/76* (2013.01); *G06F 8/52* (2013.01); *G06F 8/65* (2013.01); *G06F 8/72* (2013.01);
(Continued)

(58) Field of Classification Search
CPC ..... G06F 8/71; G06F 8/20; G06F 8/36; G06F 9/44505; G06F 8/76; G06F 8/52;
(Continued)

(56) References Cited

U.S. PATENT DOCUMENTS 5,369,702 A    11/1994 Shanton
5,805,803 A    9/1998 Birrell et al.
(Continued)

FOREIGN PATENT DOCUMENTS

CN    1313690 A    9/2001
CN    1613040 A    5/2005
(Continued)

OTHER PUBLICATIONS

Jul. 31, 2012—Citrix: "Citrix XenMobile Technology Overview White Paper"; Citrix White papers online, pp. 1-14, XP055098728, Retrieved from the Internet: URL:http://www.insight.com/content/dam/onsight/en_US/pdfs/citrix/xenmobile-tech-overview.pdf, [retrieved on Jan. 27, 2014] the whole document.
(Continued)

*Primary Examiner* — Chuck O Kendall
(74) *Attorney, Agent, or Firm* — Banner & Witcoff, Ltd.

(57) ABSTRACT

Methods and systems for developing, modifying, and distributing software applications for enterprise systems are described herein. A software component, such as a native mobile application or a template application, may be modified into a managed mobile application, and metadata associated with the managed mobile application may be generated. The managed application and associated metadata may be provided to one or more application stores, such as public application stores and/or enterprise application stores. Managed applications and/or associated metadata may be retrieved by computing devices from public application
(Continued)

stores and/or enterprise application stores, and may be executed as managed applications in an enterprise system.

18 Claims, 10 Drawing Sheets

Related U.S. Application Data

(60) Provisional application No. 61/825,384, filed on May 20, 2013, provisional application No. 61/714,469, filed on Oct. 16, 2012.

(51) Int. Cl.
  *G06F 8/65* (2018.01)
  *G06F 8/52* (2018.01)
  *G06F 8/72* (2018.01)
  *G06F 9/455* (2018.01)
  *G06F 21/57* (2013.01)
  *G06F 21/33* (2013.01)
  *G06F 21/53* (2013.01)

(52) U.S. Cl.
  CPC ...... *G06F 9/45504* (2013.01); *G06F 9/45516* (2013.01); *G06F 21/33* (2013.01); *G06F 21/53* (2013.01); *G06F 21/57* (2013.01)

(58) Field of Classification Search
  CPC .......... G06F 8/65; G06F 8/72; G06F 9/45504; G06F 9/45516; G06F 21/33; G06F 21/53; G06F 21/57; G06Q 10/10
  USPC ........................................................ 717/120
  See application file for complete search history.

(56) References Cited

U.S. PATENT DOCUMENTS

| | | |
|---|---|---|
| 6,151,606 A | 11/2000 | Mendez |
| 6,154,172 A | 11/2000 | Piccionelli et al. |
| 6,314,409 B2 | 11/2001 | Schneck et al. |
| 6,480,096 B1 | 11/2002 | Gutman et al. |
| 6,609,198 B1 | 8/2003 | Wood et al. |
| 6,621,766 B2 | 9/2003 | Brewer et al. |
| 6,751,738 B2 | 6/2004 | Wesinger, Jr. et al. |
| 6,859,879 B2 | 2/2005 | Henn et al. |
| 6,883,098 B1 | 4/2005 | Roman et al. |
| 6,901,588 B1 | 5/2005 | Krapf et al. |
| 6,987,906 B2 | 1/2006 | Nakama et al. |
| 7,043,453 B2 | 5/2006 | Stefik et al. |
| 7,065,652 B1 | 6/2006 | Xu et al. |
| 7,103,915 B2 | 9/2006 | Redlich et al. |
| 7,110,629 B2 | 9/2006 | Bjorkman et al. |
| 7,159,120 B2 | 1/2007 | Muratov et al. |
| 7,240,015 B1 | 7/2007 | Karmouch et al. |
| 7,254,831 B2 | 8/2007 | Saunders et al. |
| 7,263,256 B2 | 8/2007 | Kim et al. |
| 7,269,605 B1 | 9/2007 | Nguyen et al. |
| 7,340,772 B2 | 3/2008 | Panasyuk et al. |
| 7,349,913 B2 * | 3/2008 | Clark ............... G06F 17/30174 |
| 7,350,085 B2 | 3/2008 | Johnson et al. |
| 7,415,498 B2 | 8/2008 | Russo et al. |
| 7,437,752 B2 | 10/2008 | Heard et al. |
| 7,437,755 B2 | 10/2008 | Farino et al. |
| 7,454,102 B2 | 11/2008 | Keyser et al. |
| 7,490,073 B1 | 2/2009 | Qureshi et al. |
| 7,490,352 B2 | 2/2009 | Kramer et al. |
| 7,496,954 B1 | 2/2009 | Himawan et al. |
| 7,502,861 B1 | 3/2009 | Protassov et al. |
| 7,509,672 B1 | 3/2009 | Horwitz et al. |
| 7,515,717 B2 | 4/2009 | Doyle et al. |
| 7,526,170 B2 | 4/2009 | Kishima |
| 7,526,800 B2 | 4/2009 | Wright et al. |
| 7,529,923 B2 | 5/2009 | Chartrand et al. |
| 7,574,090 B2 | 8/2009 | Shimooka |
| 7,596,593 B2 | 9/2009 | Mitchell et al. |
| 7,599,991 B2 | 10/2009 | Vargas et al. |
| 7,623,846 B2 | 11/2009 | Hybre et al. |
| 7,631,297 B2 | 12/2009 | Childress et al. |
| 7,644,377 B1 | 1/2010 | Saxe et al. |
| 7,665,125 B2 | 2/2010 | Heard et al. |
| 7,697,737 B2 | 4/2010 | Aull et al. |
| 7,716,240 B2 | 5/2010 | Lim |
| 7,743,260 B2 | 6/2010 | Fetik |
| 7,761,523 B2 | 7/2010 | May et al. |
| 7,765,374 B2 | 7/2010 | Field et al. |
| 7,774,323 B2 | 8/2010 | Helfman |
| 7,779,408 B1 | 8/2010 | Papineau |
| 7,779,458 B1 | 8/2010 | Heiderscheit et al. |
| 7,788,535 B2 | 8/2010 | Bussa et al. |
| 7,788,536 B1 | 8/2010 | Qureshi et al. |
| 7,793,333 B2 | 9/2010 | Goh et al. |
| 7,865,888 B1 | 1/2011 | Qureshi et al. |
| 7,890,612 B2 | 2/2011 | Todd et al. |
| 7,904,468 B2 | 3/2011 | Neil et al. |
| 7,921,182 B2 | 4/2011 | Hamasaki, Jr. et al. |
| 7,921,303 B2 | 4/2011 | Mauro, II |
| 7,945,788 B2 | 5/2011 | Roberts et al. |
| 7,950,066 B1 | 5/2011 | Zuili |
| 7,966,323 B2 | 6/2011 | Bocking et al. |
| 7,966,652 B2 | 6/2011 | Ganesan |
| 7,970,386 B2 | 6/2011 | Bhat et al. |
| 7,970,923 B2 | 6/2011 | Pedersen et al. |
| 8,001,278 B2 | 8/2011 | Huggahalli et al. |
| 8,012,219 B2 | 9/2011 | Mendez et al. |
| 8,020,192 B2 | 9/2011 | Wright et al. |
| 8,037,421 B2 | 10/2011 | Scott et al. |
| 8,051,180 B2 | 11/2011 | Mazzaferri et al. |
| 8,060,074 B2 | 11/2011 | Danford et al. |
| 8,060,596 B1 | 11/2011 | Wootton et al. |
| 8,078,713 B1 | 12/2011 | Kim |
| 8,085,891 B2 | 12/2011 | Owen |
| 8,087,062 B2 | 12/2011 | Koeda |
| 8,095,517 B2 | 1/2012 | Sandoval et al. |
| 8,095,786 B1 | 1/2012 | Kshirsagar et al. |
| 8,103,765 B2 | 1/2012 | Greifeneder et al. |
| 8,108,456 B2 | 1/2012 | Chen et al. |
| 8,112,601 B2 | 2/2012 | Al-Azzawi |
| 8,117,589 B2 | 2/2012 | Christensen et al. |
| 8,126,128 B1 | 2/2012 | Hicks, III et al. |
| 8,126,506 B2 | 2/2012 | Roundtree |
| 8,132,242 B1 | 3/2012 | Wu |
| 8,179,886 B2 | 5/2012 | Hume et al. |
| 8,181,010 B1 | 5/2012 | Uchil et al. |
| 8,199,507 B2 | 6/2012 | Shohet et al. |
| 8,200,626 B1 | 6/2012 | Katzer et al. |
| 8,214,887 B2 | 7/2012 | Clark et al. |
| 8,233,882 B2 | 7/2012 | Rogel |
| 8,237,068 B2 | 8/2012 | Szaikowski |
| 8,238,256 B2 | 8/2012 | Nugent |
| 8,239,918 B1 | 8/2012 | Cohen |
| 8,245,285 B1 | 8/2012 | Ravishankar et al. |
| 8,259,705 B2 | 9/2012 | Hume |
| 8,261,231 B1 | 9/2012 | Hirsch et al. |
| 8,272,030 B1 | 9/2012 | Annan et al. |
| 8,285,681 B2 | 10/2012 | Prahlad et al. |
| 8,296,239 B2 | 10/2012 | Nonaka |
| 8,296,821 B2 | 10/2012 | Nakae |
| 8,321,953 B2 | 11/2012 | Jevans |
| 8,332,464 B2 | 12/2012 | Dispense et al. |
| 8,359,016 B2 | 1/2013 | Lindeman et al. |
| 8,365,258 B2 | 1/2013 | Dispensa |
| 8,365,266 B2 | 1/2013 | Bogner |
| 8,387,110 B1 | 2/2013 | Cooper |
| 8,402,011 B1 | 3/2013 | Bodenhamer |
| 8,406,748 B2 | 3/2013 | Raleigh et al. |
| 8,418,238 B2 | 4/2013 | Platt et al. |
| 8,443,456 B2 | 5/2013 | van der Linden |
| 8,463,128 B2 | 6/2013 | Perret-Gentil |
| 8,463,253 B2 | 6/2013 | Chipalkatti et al. |
| 8,463,946 B2 | 6/2013 | Ferguson et al. |
| 8,468,090 B2 | 6/2013 | Lesandro et al. |
| 8,468,455 B2 | 6/2013 | Jorgensen et al. |
| 8,489,685 B2 | 7/2013 | Bharadhwaj et al. |

(56) References Cited

U.S. PATENT DOCUMENTS

| | | |
|---|---|---|
| 8,495,746 B2 | 7/2013 | Fissel et al. |
| 8,528,059 B1 | 9/2013 | Labana et al. |
| 8,549,656 B2 | 10/2013 | Blaisdell et al. |
| 8,560,709 B1 | 10/2013 | Shokhor et al. |
| 8,578,443 B2 | 11/2013 | Narain et al. |
| 8,584,114 B2 | 11/2013 | Rabinovich et al. |
| 8,601,562 B2 | 12/2013 | Milas |
| 8,612,947 B2 | 12/2013 | LeRoux et al. |
| 8,613,070 B1 * | 12/2013 | Borzycki ............ G06F 21/6218 726/8 |
| 8,621,620 B2 | 12/2013 | Sallam |
| 8,650,303 B1 | 2/2014 | Lang et al. |
| 8,650,620 B2 | 2/2014 | Chawla et al. |
| 8,660,530 B2 | 2/2014 | Sharp et al. |
| 8,676,183 B2 | 3/2014 | Sesto |
| 8,687,814 B2 | 4/2014 | Nord et al. |
| 8,688,583 B2 | 4/2014 | Boccon-Gibod et al. |
| 8,695,060 B2 | 4/2014 | Wade et al. |
| 8,713,633 B2 | 4/2014 | Thomas |
| 8,719,898 B1 | 5/2014 | Barton et al. |
| 8,756,311 B2 | 6/2014 | Dare et al. |
| 8,799,994 B2 | 8/2014 | Barton et al. |
| 8,806,570 B2 | 8/2014 | Barton et al. |
| 8,819,772 B2 * | 8/2014 | Bettini ................ H04L 63/0245 709/219 |
| 8,825,863 B2 | 9/2014 | Hansson et al. |
| 8,843,734 B2 | 9/2014 | Lim |
| 8,849,348 B2 | 9/2014 | Xiao et al. |
| 8,850,010 B1 | 9/2014 | Qureshi |
| 8,850,049 B1 | 9/2014 | Qureshi |
| 8,850,177 B2 | 9/2014 | Brown et al. |
| 8,850,423 B2 | 9/2014 | Barkie et al. |
| 8,850,434 B1 | 9/2014 | Butikofer et al. |
| 8,856,909 B1 | 10/2014 | Chickering |
| 8,856,950 B2 | 10/2014 | Kim et al. |
| 8,863,297 B2 | 10/2014 | Sharma et al. |
| 8,863,298 B2 | 10/2014 | Akella et al. |
| 8,863,299 B2 | 10/2014 | Sharma et al. |
| 8,868,901 B2 | 10/2014 | Kim et al. |
| 8,869,235 B2 | 10/2014 | Qureshi et al. |
| 8,869,262 B2 | 10/2014 | Mullick et al. |
| 8,881,228 B2 | 11/2014 | Qureshi |
| 8,881,229 B2 | 11/2014 | Barton et al. |
| 8,885,096 B2 | 11/2014 | Vakil |
| 8,918,834 B1 | 12/2014 | Samuelsson |
| 8,931,038 B2 | 1/2015 | Pulier et al. |
| 8,949,929 B2 | 2/2015 | Kelly et al. |
| 8,972,980 B2 | 3/2015 | Banga et al. |
| 9,003,387 B2 | 4/2015 | Van Camp et al. |
| 9,043,242 B2 | 5/2015 | Kuriya et al. |
| 9,077,796 B2 | 7/2015 | Gittleman et al. |
| 9,098,715 B1 | 8/2015 | Spear, Jr. et al. |
| 9,135,418 B2 | 9/2015 | Wade et al. |
| 9,143,943 B2 | 9/2015 | Draluk et al. |
| 9,165,139 B2 | 10/2015 | Wade et al. |
| 9,178,981 B2 | 11/2015 | Cho et al. |
| 9,183,380 B2 | 11/2015 | Qureshi et al. |
| 9,197,672 B2 | 11/2015 | Dobson et al. |
| 9,213,850 B2 | 12/2015 | Barton et al. |
| 9,256,758 B2 | 2/2016 | Draluk et al. |
| 9,280,377 B2 | 3/2016 | Lang et al. |
| 9,311,509 B2 | 4/2016 | Casper et al. |
| 9,355,253 B2 | 5/2016 | Kellerman et al. |
| 9,356,895 B2 | 5/2016 | Chiu |
| 9,367,692 B2 | 6/2016 | Brown et al. |
| 9,509,592 B2 | 11/2016 | Draluk et al. |
| 9,521,147 B2 | 12/2016 | Barton et al. |
| 9,577,985 B2 | 2/2017 | Deasy et al. |
| 9,712,530 B2 | 7/2017 | White et al. |
| 9,716,689 B2 | 7/2017 | Andress et al. |
| 9,753,746 B2 | 9/2017 | Krzyzanowski et al. |
| 9,772,875 B2 | 9/2017 | Draluk et al. |
| 9,781,594 B2 | 10/2017 | Hailpern |
| 9,971,585 B2 | 5/2018 | Walker et al. |
| 9,973,489 B2 | 5/2018 | Barton et al. |
| 10,044,757 B2 | 8/2018 | Qureshi et al. |
| 10,402,546 B1 | 9/2019 | Qureshi et al. |
| 10,469,534 B2 | 11/2019 | Qureshi et al. |
| 10,476,885 B2 | 11/2019 | Lang et al. |
| 2001/0027383 A1 | 10/2001 | Maliszewski |
| 2001/0042045 A1 | 11/2001 | Howard et al. |
| 2002/0112047 A1 | 8/2002 | Kushwaha et al. |
| 2002/0120607 A1 | 8/2002 | Price et al. |
| 2002/0180790 A1 | 12/2002 | Broussard |
| 2003/0031319 A1 | 2/2003 | Abe et al. |
| 2003/0037103 A1 | 2/2003 | Salmi et al. |
| 2003/0046366 A1 | 3/2003 | Pardikar et al. |
| 2003/0065947 A1 | 4/2003 | Song et al. |
| 2003/0083954 A1 | 5/2003 | Namba |
| 2003/0103075 A1 | 6/2003 | Rosselot |
| 2003/0131245 A1 | 7/2003 | Linderman |
| 2003/0157947 A1 | 8/2003 | Fiatal et al. |
| 2003/0188193 A1 | 10/2003 | Venkataramappa |
| 2003/0221184 A1 | 11/2003 | Gunjal et al. |
| 2003/0229623 A1 | 12/2003 | Chang et al. |
| 2003/0229786 A1 | 12/2003 | Hollis et al. |
| 2003/0236861 A1 | 12/2003 | Johnson et al. |
| 2004/0006706 A1 | 1/2004 | Erlingsson |
| 2004/0010579 A1 | 1/2004 | Freese |
| 2004/0012041 A1 | 1/2004 | West et al. |
| 2004/0083273 A1 | 4/2004 | Madison et al. |
| 2004/0096152 A1 | 5/2004 | Nakama et al. |
| 2004/0107342 A1 | 6/2004 | Pham et al. |
| 2004/0111640 A1 | 6/2004 | Baum |
| 2004/0114853 A1 | 6/2004 | Bjorkman et al. |
| 2004/0117651 A1 | 6/2004 | Little et al. |
| 2004/0123153 A1 | 6/2004 | Wright et al. |
| 2004/0205233 A1 | 10/2004 | Dunk |
| 2004/0230807 A1 | 11/2004 | Baird et al. |
| 2004/0243349 A1 | 12/2004 | Greifeneder et al. |
| 2004/0243699 A1 | 12/2004 | Koclanes et al. |
| 2005/0027843 A1 | 2/2005 | Bozak et al. |
| 2005/0027862 A1 | 2/2005 | Nguyen et al. |
| 2005/0055578 A1 | 3/2005 | Wright et al. |
| 2005/0063637 A1 | 3/2005 | Mershon et al. |
| 2005/0076082 A1 | 4/2005 | Le Pennec et al. |
| 2005/0076085 A1 | 4/2005 | Budd et al. |
| 2005/0086328 A1 | 4/2005 | Landram et al. |
| 2005/0097608 A1 | 5/2005 | Penke et al. |
| 2005/0111354 A1 | 5/2005 | Asano et al. |
| 2005/0149340 A1 | 7/2005 | Murakami et al. |
| 2005/0166264 A1 | 7/2005 | Yamada et al. |
| 2005/0172241 A1 | 8/2005 | Daniels et al. |
| 2005/0193222 A1 | 9/2005 | Greene |
| 2005/0210252 A1 | 9/2005 | Freeman et al. |
| 2005/0210289 A1 | 9/2005 | Brown et al. |
| 2005/0255838 A1 | 11/2005 | Adams et al. |
| 2005/0262429 A1 | 11/2005 | Elder et al. |
| 2005/0265548 A1 | 12/2005 | Tsuchimura |
| 2005/0273592 A1 | 12/2005 | Pryor et al. |
| 2006/0005250 A1 | 1/2006 | Chu et al. |
| 2006/0031679 A1 | 2/2006 | Soltis et al. |
| 2006/0048142 A1 | 3/2006 | Roese et al. |
| 2006/0070114 A1 | 3/2006 | Wood et al. |
| 2006/0075036 A1 | 4/2006 | Malik |
| 2006/0075123 A1 | 4/2006 | Burr et al. |
| 2006/0080432 A1 | 4/2006 | Spataro et al. |
| 2006/0085826 A1 | 4/2006 | Funk et al. |
| 2006/0094400 A1 | 5/2006 | Beachem et al. |
| 2006/0105479 A1 | 5/2006 | Cave et al. |
| 2006/0112428 A1 | 5/2006 | Etelapera |
| 2006/0117104 A1 | 6/2006 | Taniguchi et al. |
| 2006/0120526 A1 | 6/2006 | Boucher et al. |
| 2006/0141985 A1 | 6/2006 | Patel et al. |
| 2006/0147043 A1 | 7/2006 | Mann et al. |
| 2006/0161635 A1 | 7/2006 | Lamkin et al. |
| 2006/0161783 A1 | 7/2006 | Aiken et al. |
| 2006/0185004 A1 | 8/2006 | Song et al. |
| 2006/0200814 A1 | 9/2006 | Kontinen et al. |
| 2006/0224742 A1 | 10/2006 | Shahbazi |
| 2006/0225033 A1 | 10/2006 | Ye et al. |
| 2006/0225142 A1 | 10/2006 | Moon |
| 2006/0242685 A1 | 10/2006 | Heard et al. |
| 2006/0248577 A1 | 11/2006 | Beghian et al. |

(56) References Cited

U.S. PATENT DOCUMENTS

| | | |
|---|---|---|
| 2006/0253508 A1 | 11/2006 | Colton et al. |
| 2006/0256739 A1 | 11/2006 | Seier et al. |
| 2006/0259755 A1 | 11/2006 | Kenoyer |
| 2006/0277590 A1 | 12/2006 | Limont et al. |
| 2006/0282876 A1 | 12/2006 | Shelest et al. |
| 2006/0282889 A1 | 12/2006 | Brown et al. |
| 2007/0005713 A1 | 1/2007 | LeVasseur et al. |
| 2007/0006289 A1 | 1/2007 | Limont et al. |
| 2007/0006327 A1 | 1/2007 | Lal et al. |
| 2007/0011749 A1 | 1/2007 | Allison et al. |
| 2007/0016771 A1 | 1/2007 | Allison et al. |
| 2007/0016907 A1 | 1/2007 | Benedetti et al. |
| 2007/0024646 A1 | 2/2007 | Saarinen et al. |
| 2007/0038764 A1 | 2/2007 | Maillard |
| 2007/0049297 A1 | 3/2007 | Gopalan et al. |
| 2007/0054627 A1 | 3/2007 | Wormald |
| 2007/0056043 A1 | 3/2007 | Onyon et al. |
| 2007/0072598 A1 | 3/2007 | Coleman et al. |
| 2007/0074033 A1 | 3/2007 | Adams et al. |
| 2007/0079249 A1 | 4/2007 | Pall et al. |
| 2007/0088825 A1 | 4/2007 | Hodul |
| 2007/0094220 A1 | 4/2007 | McCaffrey |
| 2007/0100938 A1 | 5/2007 | Bagley et al. |
| 2007/0109983 A1 | 5/2007 | Shankar et al. |
| 2007/0118558 A1 | 5/2007 | Kahandaliyanage |
| 2007/0136471 A1 | 6/2007 | Jardin |
| 2007/0143515 A1 | 6/2007 | Kershaw et al. |
| 2007/0156897 A1 | 7/2007 | Lim |
| 2007/0180447 A1 | 8/2007 | Mazzaferri et al. |
| 2007/0180450 A1 | 8/2007 | Croft et al. |
| 2007/0180509 A1 | 8/2007 | Swartz et al. |
| 2007/0186106 A1 | 8/2007 | Ting et al. |
| 2007/0198656 A1 | 8/2007 | Mazzaferri et al. |
| 2007/0199051 A1 | 8/2007 | Parikh et al. |
| 2007/0204153 A1 | 8/2007 | Tome et al. |
| 2007/0204166 A1 | 8/2007 | Tome et al. |
| 2007/0208936 A1 | 9/2007 | Ramos Robles |
| 2007/0214272 A1 | 9/2007 | Isaacson |
| 2007/0226034 A1 | 9/2007 | Khan |
| 2007/0226225 A1 | 9/2007 | Yiu et al. |
| 2007/0226227 A1 | 9/2007 | Helfman |
| 2007/0226773 A1 | 9/2007 | Pouliot |
| 2007/0244987 A1 | 10/2007 | Pedersen et al. |
| 2007/0245409 A1 | 10/2007 | Harris et al. |
| 2007/0248085 A1 | 10/2007 | Volpano |
| 2007/0253663 A1 | 11/2007 | Keyser et al. |
| 2007/0262327 A1 | 11/2007 | Shimooka |
| 2007/0266421 A1 | 11/2007 | Vaidya et al. |
| 2007/0266422 A1 | 11/2007 | Germano et al. |
| 2007/0283324 A1 | 12/2007 | Geisinger |
| 2008/0027871 A1 | 1/2008 | Seo |
| 2008/0027982 A1 | 1/2008 | Subramanian et al. |
| 2008/0040775 A1 | 2/2008 | Hoff et al. |
| 2008/0046580 A1 | 2/2008 | Lafuente et al. |
| 2008/0047006 A1 | 2/2008 | Jeong et al. |
| 2008/0047015 A1 | 2/2008 | Cornwall et al. |
| 2008/0052395 A1 | 2/2008 | Wright et al. |
| 2008/0066020 A1 | 3/2008 | Boss et al. |
| 2008/0066177 A1 | 3/2008 | Bender |
| 2008/0070495 A1 | 3/2008 | Stricklen et al. |
| 2008/0085075 A1 | 4/2008 | Kishima |
| 2008/0092215 A1 | 4/2008 | Soukup et al. |
| 2008/0127292 A1 | 5/2008 | Cooper et al. |
| 2008/0127327 A1 | 5/2008 | Carrasco |
| 2008/0133729 A1 | 6/2008 | Fridman et al. |
| 2008/0134292 A1 | 6/2008 | Adel et al. |
| 2008/0141335 A1 | 6/2008 | Thomas |
| 2008/0163188 A1 | 7/2008 | Siskind et al. |
| 2008/0163286 A1 | 7/2008 | Rudolph et al. |
| 2008/0167002 A1 | 7/2008 | Kim et al. |
| 2008/0178169 A1 | 7/2008 | Grossner et al. |
| 2008/0178300 A1 | 7/2008 | Brown et al. |
| 2008/0183820 A1 | 7/2008 | Golovchinsky et al. |
| 2008/0183996 A1 | 7/2008 | Field et al. |
| 2008/0192739 A1 | 8/2008 | Carrasco |
| 2008/0194296 A1 | 8/2008 | Roundtree |
| 2008/0196038 A1 | 8/2008 | Antonio et al. |
| 2008/0196082 A1 | 8/2008 | Sandoval et al. |
| 2008/0209506 A1 | 8/2008 | Ghai et al. |
| 2008/0209564 A1 | 8/2008 | Gayde et al. |
| 2008/0214300 A1 | 9/2008 | Williams et al. |
| 2008/0229117 A1 | 9/2008 | Shin et al. |
| 2008/0235760 A1 | 9/2008 | Broussard et al. |
| 2008/0263224 A1 | 10/2008 | Gilhuly et al. |
| 2008/0270240 A1 | 10/2008 | Chu |
| 2008/0271111 A1 | 10/2008 | Cox et al. |
| 2008/0282314 A1 | 11/2008 | Abzarian et al. |
| 2008/0301639 A1 | 12/2008 | Bell et al. |
| 2008/0304665 A1 | 12/2008 | Ma et al. |
| 2008/0310623 A1 | 12/2008 | Phillips, II et al. |
| 2008/0313257 A1 | 12/2008 | Allen et al. |
| 2008/0317292 A1 | 12/2008 | Baker et al. |
| 2008/0318616 A1 | 12/2008 | Chipalkatti et al. |
| 2009/0006232 A1 | 1/2009 | Gallagher et al. |
| 2009/0028049 A1 | 1/2009 | Boudreau et al. |
| 2009/0030968 A1 | 1/2009 | Boudreau et al. |
| 2009/0037686 A1 | 2/2009 | Mendonca |
| 2009/0037976 A1 | 2/2009 | Teo et al. |
| 2009/0049425 A1 | 2/2009 | Liepert et al. |
| 2009/0051755 A1 | 2/2009 | Toya et al. |
| 2009/0064292 A1 | 3/2009 | Carter et al. |
| 2009/0067079 A1 | 3/2009 | Al-Azzawi |
| 2009/0075630 A1 | 3/2009 | McLean |
| 2009/0077638 A1 | 3/2009 | Norman et al. |
| 2009/0083374 A1 | 3/2009 | Saint Clair |
| 2009/0100060 A1 | 4/2009 | Livnat et al. |
| 2009/0119773 A1 | 5/2009 | D'Amore et al. |
| 2009/0121890 A1 | 5/2009 | Brown et al. |
| 2009/0170532 A1 | 7/2009 | Lee et al. |
| 2009/0172657 A1 | 7/2009 | Makelainen et al. |
| 2009/0172789 A1 | 7/2009 | Band et al. |
| 2009/0178111 A1 | 7/2009 | Moriconi et al. |
| 2009/0183227 A1 | 7/2009 | Isaacs et al. |
| 2009/0187763 A1 | 7/2009 | Freericks et al. |
| 2009/0199178 A1 | 8/2009 | Keller et al. |
| 2009/0199277 A1 | 8/2009 | Norman et al. |
| 2009/0210360 A1 | 8/2009 | Sankar et al. |
| 2009/0210934 A1 | 8/2009 | Innes |
| 2009/0221278 A1 | 9/2009 | Spelta et al. |
| 2009/0222880 A1 | 9/2009 | Mayer et al. |
| 2009/0228714 A1 | 9/2009 | Fiske et al. |
| 2009/0228954 A1 | 9/2009 | Hu et al. |
| 2009/0228963 A1 | 9/2009 | Pearce et al. |
| 2009/0249359 A1 | 10/2009 | Caunter et al. |
| 2009/0253410 A1 | 10/2009 | Fitzgerald et al. |
| 2009/0253412 A1 | 10/2009 | Sigmund et al. |
| 2009/0263923 A1 | 10/2009 | Shimooka |
| 2009/0265554 A1 | 10/2009 | Robles et al. |
| 2009/0271355 A1 | 10/2009 | Sekiguchi |
| 2009/0282127 A1 | 11/2009 | Leblanc et al. |
| 2009/0282473 A1 | 11/2009 | Karlson et al. |
| 2009/0319772 A1 | 12/2009 | Singh et al. |
| 2009/0323916 A1 | 12/2009 | O'Sullivan et al. |
| 2009/0325615 A1 | 12/2009 | McKay et al. |
| 2009/0327885 A1 | 12/2009 | Aoki et al. |
| 2009/0327994 A1 | 12/2009 | Christensen et al. |
| 2010/0049874 A1 | 2/2010 | Chene et al. |
| 2010/0050092 A1 | 2/2010 | Williams et al. |
| 2010/0054463 A1 | 3/2010 | Tsan |
| 2010/0058352 A1 | 3/2010 | Esfahany et al. |
| 2010/0064341 A1 | 3/2010 | Aldera |
| 2010/0064354 A1 | 3/2010 | Irvine |
| 2010/0077445 A1 | 3/2010 | Schneider et al. |
| 2010/0077469 A1 | 3/2010 | Furman et al. |
| 2010/0083358 A1 | 4/2010 | Govindarajan et al. |
| 2010/0100825 A1 | 4/2010 | Sharoni |
| 2010/0100925 A1 | 4/2010 | Hinton |
| 2010/0124196 A1 | 5/2010 | Bonar et al. |
| 2010/0125730 A1 | 5/2010 | Dodgson et al. |
| 2010/0146523 A1 | 6/2010 | Brigaut et al. |
| 2010/0146582 A1 | 6/2010 | Jaber et al. |
| 2010/0150341 A1 | 6/2010 | Dodgson et al. |
| 2010/0154025 A1 | 6/2010 | Esteve Balducci et al. |
| 2010/0162232 A1 | 6/2010 | Bhatia et al. |

(56) References Cited

U.S. PATENT DOCUMENTS

| | | |
|---|---|---|
| 2010/0173607 A1 | 7/2010 | Thornton et al. |
| 2010/0180346 A1 | 7/2010 | Nicolson et al. |
| 2010/0192212 A1 | 7/2010 | Raleigh |
| 2010/0218167 A1 | 8/2010 | Turner et al. |
| 2010/0228825 A1 | 9/2010 | Hegde et al. |
| 2010/0228961 A1 | 9/2010 | Burns et al. |
| 2010/0229197 A1 | 9/2010 | Yi et al. |
| 2010/0235216 A1 | 9/2010 | Hehmeyer et al. |
| 2010/0235881 A1 | 9/2010 | Liu et al. |
| 2010/0248699 A1 | 9/2010 | Dumais |
| 2010/0257580 A1 | 10/2010 | Zhao et al. |
| 2010/0269156 A1 | 10/2010 | Hohlfeld et al. |
| 2010/0279652 A1 | 11/2010 | Sharp et al. |
| 2010/0281528 A1 | 11/2010 | Hayton et al. |
| 2010/0287619 A1 | 11/2010 | Chase |
| 2010/0299152 A1 | 11/2010 | Batchu et al. |
| 2010/0299376 A1 | 11/2010 | Batchu et al. |
| 2010/0317336 A1 | 12/2010 | Ferren et al. |
| 2010/0318992 A1 | 12/2010 | Kushwaha et al. |
| 2010/0319053 A1 | 12/2010 | Gharabally |
| 2010/0325097 A1 | 12/2010 | Er et al. |
| 2010/0331017 A1 | 12/2010 | Ariga |
| 2010/0333165 A1 | 12/2010 | Basak et al. |
| 2011/0030044 A1 | 2/2011 | Kranendonk et al. |
| 2011/0072492 A1 | 3/2011 | Mohler et al. |
| 2011/0078675 A1 | 3/2011 | Van Camp et al. |
| 2011/0082900 A1 | 4/2011 | Nagpal et al. |
| 2011/0099602 A1 | 4/2011 | Apparao et al. |
| 2011/0145360 A1 | 6/2011 | Sheshagiri et al. |
| 2011/0145833 A1 | 6/2011 | De Los Reyes et al. |
| 2011/0154266 A1 | 6/2011 | Friend et al. |
| 2011/0154305 A1 | 6/2011 | LeRoux et al. |
| 2011/0154477 A1 | 6/2011 | Parla et al. |
| 2011/0154498 A1 | 6/2011 | Fissel et al. |
| 2011/0167492 A1 | 7/2011 | Ghosh et al. |
| 2011/0179484 A1 | 7/2011 | Tuvell et al. |
| 2011/0208797 A1 | 8/2011 | Kim |
| 2011/0208838 A1 | 8/2011 | Thomas et al. |
| 2011/0209064 A1 | 8/2011 | Jorgensen et al. |
| 2011/0209194 A1 | 8/2011 | Kennedy |
| 2011/0219124 A1 | 9/2011 | Allen et al. |
| 2011/0225417 A1 | 9/2011 | Maharajh et al. |
| 2011/0239125 A1 | 9/2011 | Kristensen et al. |
| 2011/0252232 A1 | 10/2011 | De Atley et al. |
| 2011/0252459 A1 | 10/2011 | Walsh et al. |
| 2011/0258301 A1 | 10/2011 | McCormick et al. |
| 2011/0270963 A1 | 11/2011 | Saito et al. |
| 2011/0271279 A1 | 11/2011 | Pate |
| 2011/0276683 A1 | 11/2011 | Goldschlag et al. |
| 2011/0276699 A1 | 11/2011 | Pedersen |
| 2011/0277026 A1 | 11/2011 | Agarwal et al. |
| 2011/0277027 A1 | 11/2011 | Hayton et al. |
| 2011/0283347 A1 | 11/2011 | Bhuta et al. |
| 2011/0295970 A1 | 12/2011 | Miyazawa |
| 2011/0296333 A1 | 12/2011 | Bateman et al. |
| 2011/0314534 A1 | 12/2011 | James |
| 2012/0002813 A1 | 1/2012 | Wei et al. |
| 2012/0005476 A1 | 1/2012 | Wei et al. |
| 2012/0005724 A1 | 1/2012 | Lee |
| 2012/0005745 A1 | 1/2012 | Wei et al. |
| 2012/0005746 A1 | 1/2012 | Wei et al. |
| 2012/0023378 A1 | 1/2012 | Nomura et al. |
| 2012/0023506 A1 | 1/2012 | Maeckel et al. |
| 2012/0023556 A1 | 1/2012 | Schultz et al. |
| 2012/0030649 A1 | 2/2012 | Chapa |
| 2012/0036347 A1 | 2/2012 | Swanson et al. |
| 2012/0036370 A1 | 2/2012 | Lim et al. |
| 2012/0042036 A1 | 2/2012 | Lau et al. |
| 2012/0052954 A1 | 3/2012 | Zhu et al. |
| 2012/0054853 A1 | 3/2012 | Gupta et al. |
| 2012/0066691 A1 | 3/2012 | Branton |
| 2012/0079475 A1 | 3/2012 | Hicks, III et al. |
| 2012/0079556 A1 | 3/2012 | Wahl |
| 2012/0079603 A1 | 3/2012 | Brown et al. |
| 2012/0079609 A1 | 3/2012 | Bender et al. |
| 2012/0084184 A1 | 4/2012 | Raleigh et al. |
| 2012/0088540 A1 | 4/2012 | Smith et al. |
| 2012/0096533 A1 | 4/2012 | Boulos et al. |
| 2012/0096544 A1 | 4/2012 | Hosoda |
| 2012/0099219 A1 | 4/2012 | Al-Azzawi |
| 2012/0102195 A1 | 4/2012 | Adams et al. |
| 2012/0102564 A1 | 4/2012 | Schentrup et al. |
| 2012/0109384 A1 | 5/2012 | Stepanian |
| 2012/0110317 A1 | 5/2012 | Scheer et al. |
| 2012/0117622 A1 | 5/2012 | Gronholm et al. |
| 2012/0129503 A1 | 5/2012 | Lindeman et al. |
| 2012/0131116 A1 | 5/2012 | Tu et al. |
| 2012/0131343 A1 | 5/2012 | Choi et al. |
| 2012/0131685 A1 | 5/2012 | Broch et al. |
| 2012/0137364 A1 | 5/2012 | Blaisdell |
| 2012/0151033 A1 | 6/2012 | Baliga et al. |
| 2012/0154265 A1 | 6/2012 | Kim et al. |
| 2012/0154413 A1 | 6/2012 | Kim et al. |
| 2012/0157165 A1 | 6/2012 | Kim et al. |
| 2012/0157166 A1 | 6/2012 | Kim et al. |
| 2012/0159139 A1 | 6/2012 | Kim et al. |
| 2012/0159334 A1 | 6/2012 | Messerly et al. |
| 2012/0165075 A1 | 6/2012 | Kim et al. |
| 2012/0166516 A1 | 6/2012 | Simmons et al. |
| 2012/0166524 A1 | 6/2012 | Watakabe et al. |
| 2012/0166966 A1 | 6/2012 | Wood et al. |
| 2012/0166997 A1 | 6/2012 | Cho et al. |
| 2012/0167118 A1 | 6/2012 | Pingili et al. |
| 2012/0167159 A1 | 6/2012 | Mefford, Jr. et al. |
| 2012/0173687 A1 | 7/2012 | Brown et al. |
| 2012/0174237 A1 | 7/2012 | Krzyzanowski |
| 2012/0179802 A1 | 7/2012 | Narasimhan et al. |
| 2012/0179909 A1 | 7/2012 | Sagi et al. |
| 2012/0185910 A1 | 7/2012 | Miettinen et al. |
| 2012/0185913 A1 | 7/2012 | Martinez et al. |
| 2012/0191716 A1 | 7/2012 | Omoigui |
| 2012/0192181 A1 | 7/2012 | Gilbert et al. |
| 2012/0198570 A1 | 8/2012 | Joa et al. |
| 2012/0204220 A1 | 8/2012 | Lavi |
| 2012/0209949 A1 | 8/2012 | Deliyannis et al. |
| 2012/0210068 A1 | 8/2012 | Joshi et al. |
| 2012/0210443 A1 | 8/2012 | Blaisdell et al. |
| 2012/0214472 A1 | 8/2012 | Tadayon et al. |
| 2012/0222120 A1 | 8/2012 | Rim et al. |
| 2012/0233130 A1 | 9/2012 | Vedachalam et al. |
| 2012/0238206 A1 | 9/2012 | Singh et al. |
| 2012/0238257 A1 | 9/2012 | Anson |
| 2012/0240183 A1 | 9/2012 | Sinha |
| 2012/0246191 A1 | 9/2012 | Xiong |
| 2012/0246484 A1 | 9/2012 | Blaisdell et al. |
| 2012/0246731 A1 | 9/2012 | Blaisdell et al. |
| 2012/0250106 A1 | 10/2012 | Kiran Kannambadi et al. |
| 2012/0254768 A1 | 10/2012 | Aggarwal et al. |
| 2012/0255026 A1 | 10/2012 | Baca et al. |
| 2012/0265528 A1 | 10/2012 | Gruber et al. |
| 2012/0265792 A1 | 10/2012 | Salters |
| 2012/0270522 A1 | 10/2012 | Laudermilch et al. |
| 2012/0272221 A1 | 10/2012 | Pessoa et al. |
| 2012/0278454 A1 | 11/2012 | Stewart et al. |
| 2012/0284325 A1 | 11/2012 | Erb |
| 2012/0284529 A1 | 11/2012 | Crowe |
| 2012/0284779 A1 | 11/2012 | Ingrassia, Jr. et al. |
| 2012/0290694 A9 | 11/2012 | Marl et al. |
| 2012/0291114 A1 | 11/2012 | Poliashenko et al. |
| 2012/0303476 A1 | 11/2012 | Krzyzanowski et al. |
| 2012/0303778 A1 | 11/2012 | Ahiska et al. |
| 2012/0304310 A1 | 11/2012 | Blaisdell |
| 2012/0311154 A1 | 12/2012 | Morgan |
| 2012/0311659 A1 | 12/2012 | Narain et al. |
| 2012/0317185 A1 | 12/2012 | Shah et al. |
| 2012/0321087 A1 | 12/2012 | Fleischman et al. |
| 2012/0324568 A1 | 12/2012 | Wyatt et al. |
| 2012/0331088 A1 | 12/2012 | O'Hare et al. |
| 2012/0331527 A1 | 12/2012 | Walters et al. |
| 2012/0331528 A1 | 12/2012 | Fu et al. |
| 2013/0002725 A1 | 1/2013 | Kim et al. |
| 2013/0007245 A1 | 1/2013 | Malik et al. |
| 2013/0007842 A1 | 1/2013 | Park et al. |
| 2013/0013653 A1 | 1/2013 | Thompson |

(56) References Cited

U.S. PATENT DOCUMENTS

| | | |
|---|---|---|
| 2013/0013688 A1 | 1/2013 | Wang et al. |
| 2013/0013727 A1 | 1/2013 | Walker |
| 2013/0013932 A1 | 1/2013 | Kong et al. |
| 2013/0014239 A1 | 1/2013 | Pieczul et al. |
| 2013/0014267 A1 | 1/2013 | Farrugia et al. |
| 2013/0019013 A1 | 1/2013 | Rice et al. |
| 2013/0019018 A1 | 1/2013 | Rice |
| 2013/0019282 A1 | 1/2013 | Rice et al. |
| 2013/0024424 A1 | 1/2013 | Prahlad et al. |
| 2013/0024928 A1 | 1/2013 | Burke et al. |
| 2013/0031544 A1 | 1/2013 | Sridharan et al. |
| 2013/0035063 A1 | 2/2013 | Fisk et al. |
| 2013/0042294 A1 | 2/2013 | Colvin et al. |
| 2013/0042295 A1 | 2/2013 | Kelly et al. |
| 2013/0054922 A1 | 2/2013 | Tuch et al. |
| 2013/0054962 A1 | 2/2013 | Chawla et al. |
| 2013/0055378 A1 | 2/2013 | Chang et al. |
| 2013/0059284 A1 | 3/2013 | Giedgowd, Jr. et al. |
| 2013/0066960 A1 | 3/2013 | Fieremans et al. |
| 2013/0066978 A1 | 3/2013 | Bentley et al. |
| 2013/0067229 A1 | 3/2013 | German et al. |
| 2013/0074142 A1 | 3/2013 | Brennan et al. |
| 2013/0078949 A1 | 3/2013 | Pecen et al. |
| 2013/0081104 A1 | 3/2013 | Jung et al. |
| 2013/0084847 A1 | 4/2013 | Tibbitts et al. |
| 2013/0086479 A1 | 4/2013 | Brown et al. |
| 2013/0086684 A1 | 4/2013 | Mohler |
| 2013/0088605 A1 | 4/2013 | Quarfordt et al. |
| 2013/0091205 A1 | 4/2013 | Kotler et al. |
| 2013/0091440 A1 | 4/2013 | Kotler et al. |
| 2013/0091543 A1 | 4/2013 | Wade et al. |
| 2013/0095785 A1 | 4/2013 | Sadana et al. |
| 2013/0097296 A1 | 4/2013 | Gehrmann et al. |
| 2013/0097421 A1 | 4/2013 | Lim |
| 2013/0097660 A1 | 4/2013 | Das et al. |
| 2013/0103797 A1 | 4/2013 | Park et al. |
| 2013/0111540 A1 | 5/2013 | Sabin |
| 2013/0117240 A1 | 5/2013 | Taylor et al. |
| 2013/0117563 A1 | 5/2013 | Grabelkovsky |
| 2013/0117805 A1 | 5/2013 | Kent et al. |
| 2013/0117840 A1 | 5/2013 | Roesner et al. |
| 2013/0124673 A1 | 5/2013 | Hjelm et al. |
| 2013/0130651 A1 | 5/2013 | Deasy et al. |
| 2013/0130652 A1 | 5/2013 | Deasy et al. |
| 2013/0130653 A1 | 5/2013 | Deasy et al. |
| 2013/0130669 A1 | 5/2013 | Xiao et al. |
| 2013/0132457 A1 | 5/2013 | Diwakar |
| 2013/0132941 A1 | 5/2013 | Lindeman et al. |
| 2013/0133043 A1 | 5/2013 | Barkie et al. |
| 2013/0133061 A1 | 5/2013 | Fainkichen et al. |
| 2013/0138766 A1 | 5/2013 | Draluk et al. |
| 2013/0138810 A1 | 5/2013 | Binyamin et al. |
| 2013/0138932 A1 | 5/2013 | Draluk et al. |
| 2013/0138954 A1 | 5/2013 | Draluk et al. |
| 2013/0139241 A1 | 5/2013 | Leeder |
| 2013/0142043 A1 | 6/2013 | Tapia et al. |
| 2013/0144934 A1 | 6/2013 | Swett et al. |
| 2013/0145448 A1 | 6/2013 | Newell |
| 2013/0151598 A1 | 6/2013 | Fu et al. |
| 2013/0151681 A1 | 6/2013 | Dournov et al. |
| 2013/0167247 A1 | 6/2013 | Brown et al. |
| 2013/0171967 A1 | 7/2013 | Ashour et al. |
| 2013/0212212 A1 | 8/2013 | Addepalli et al. |
| 2013/0219022 A1 | 8/2013 | Manivel et al. |
| 2013/0219176 A1 | 8/2013 | Akella et al. |
| 2013/0219211 A1 | 8/2013 | Gopinath et al. |
| 2013/0219456 A1 | 8/2013 | Sharma et al. |
| 2013/0219465 A1 | 8/2013 | Tse et al. |
| 2013/0227551 A1 | 8/2013 | Tsirkin |
| 2013/0227561 A1 | 8/2013 | Walsh et al. |
| 2013/0227636 A1 | 8/2013 | Bettini et al. |
| 2013/0227659 A1 | 8/2013 | Raleigh |
| 2013/0232541 A1 | 9/2013 | Kapadia et al. |
| 2013/0237152 A1 | 9/2013 | Taggar et al. |
| 2013/0239192 A1 | 9/2013 | Linga et al. |
| 2013/0254262 A1 | 9/2013 | Udall |
| 2013/0254660 A1 | 9/2013 | Fujioka |
| 2013/0254831 A1 | 9/2013 | Roach et al. |
| 2013/0260730 A1 | 10/2013 | Toy et al. |
| 2013/0263208 A1 | 10/2013 | Challa |
| 2013/0263209 A1 | 10/2013 | Panuganty |
| 2013/0268676 A1 | 10/2013 | Martins et al. |
| 2013/0283335 A1 | 10/2013 | Lakshminarayanan et al. |
| 2013/0288656 A1 | 10/2013 | Schultz et al. |
| 2013/0290709 A1 | 10/2013 | Muppidi et al. |
| 2013/0291052 A1 | 10/2013 | Hadar et al. |
| 2013/0291055 A1 | 10/2013 | Muppidi et al. |
| 2013/0291086 A1 | 10/2013 | Pontillo et al. |
| 2013/0297604 A1 | 11/2013 | Sutedja et al. |
| 2013/0297662 A1 | 11/2013 | Sharma et al. |
| 2013/0298185 A1 | 11/2013 | Koneru et al. |
| 2013/0298201 A1 | 11/2013 | Aravindakshan et al. |
| 2013/0298242 A1 | 11/2013 | Kumar et al. |
| 2013/0303194 A1 | 11/2013 | Rowles |
| 2013/0305354 A1 | 11/2013 | King et al. |
| 2013/0311593 A1 | 11/2013 | Prince et al. |
| 2013/0311597 A1 | 11/2013 | Arrouye et al. |
| 2013/0317952 A1 | 11/2013 | Tomassetti et al. |
| 2013/0318345 A1 | 11/2013 | Hengeveld |
| 2013/0326492 A1 | 12/2013 | Hunt et al. |
| 2013/0333005 A1 | 12/2013 | Kim et al. |
| 2013/0346268 A1 | 12/2013 | Pereira et al. |
| 2013/0347130 A1 | 12/2013 | Sima |
| 2014/0006347 A1 | 1/2014 | Qureshi et al. |
| 2014/0006512 A1 | 1/2014 | Huang et al. |
| 2014/0007183 A1 | 1/2014 | Qureshi et al. |
| 2014/0007214 A1 | 1/2014 | Qureshi et al. |
| 2014/0007215 A1 | 1/2014 | Romano et al. |
| 2014/0007222 A1 | 1/2014 | Qureshi et al. |
| 2014/0012983 A1 | 1/2014 | Brown et al. |
| 2014/0020062 A1 | 1/2014 | Tumula et al. |
| 2014/0020073 A1 | 1/2014 | Ronda et al. |
| 2014/0026128 A1 | 1/2014 | Rocha De la hoz et al. |
| 2014/0032691 A1 | 1/2014 | Barton et al. |
| 2014/0032733 A1 | 1/2014 | Barton et al. |
| 2014/0032758 A1 | 1/2014 | Barton et al. |
| 2014/0032759 A1 | 1/2014 | Barton et al. |
| 2014/0033271 A1 | 1/2014 | Barton et al. |
| 2014/0040638 A1 | 2/2014 | Barton et al. |
| 2014/0040656 A1 | 2/2014 | Ho et al. |
| 2014/0040977 A1 | 2/2014 | Barton et al. |
| 2014/0040978 A1 | 2/2014 | Barton et al. |
| 2014/0040979 A1* | 2/2014 | Barton .................. H04L 63/20 726/1 |
| 2014/0047413 A1 | 2/2014 | Sheive et al. |
| 2014/0047535 A1 | 2/2014 | Parla et al. |
| 2014/0049496 A1 | 2/2014 | Szalkowski |
| 2014/0059640 A9 | 2/2014 | Raleigh et al. |
| 2014/0059642 A1 | 2/2014 | Deasy et al. |
| 2014/0096199 A1 | 4/2014 | Dave et al. |
| 2014/0096230 A1 | 4/2014 | Wade |
| 2014/0108558 A1* | 4/2014 | Borzycki ............ G06F 21/6218 709/205 |
| 2014/0108649 A1 | 4/2014 | Barton et al. |
| 2014/0109072 A1* | 4/2014 | Lang .................... G06F 8/52 717/168 |
| 2014/0109078 A1 | 4/2014 | Lang et al. |
| 2014/0111316 A1 | 4/2014 | Kim |
| 2014/0115693 A1 | 4/2014 | Schieman et al. |
| 2014/0122645 A1 | 5/2014 | Brown et al. |
| 2014/0130174 A1 | 5/2014 | Celi, Jr. et al. |
| 2014/0137205 A1 | 5/2014 | Brown et al. |
| 2014/0149599 A1 | 5/2014 | Krishna et al. |
| 2014/0162614 A1 | 6/2014 | Lindeman et al. |
| 2014/0164946 A1 | 6/2014 | Brown |
| 2014/0173700 A1 | 6/2014 | Awan et al. |
| 2014/0181803 A1 | 6/2014 | Cooper et al. |
| 2014/0181934 A1 | 6/2014 | Mayblum et al. |
| 2014/0189670 A1 | 7/2014 | Clay |
| 2014/0189781 A1 | 7/2014 | Manickam et al. |
| 2014/0189808 A1 | 7/2014 | Mahaffey et al. |
| 2014/0259178 A1 | 9/2014 | Karaa et al. |
| 2014/0280962 A1 | 9/2014 | Schultz |
| 2014/0281475 A1 | 9/2014 | Schultz |

(56) References Cited

U.S. PATENT DOCUMENTS

| | | |
|---|---|---|
| 2014/0281499 A1 | 9/2014 | Schentrup et al. |
| 2014/0282460 A1 | 9/2014 | Cai et al. |
| 2014/0282876 A1 | 9/2014 | Schentrup et al. |
| 2014/0283030 A1 | 9/2014 | Moore et al. |
| 2014/0298401 A1 | 10/2014 | Batson et al. |
| 2014/0315536 A1 | 10/2014 | Chow et al. |
| 2014/0317273 A1 | 10/2014 | Kruglick |
| 2014/0317704 A1 | 10/2014 | Schentrup et al. |
| 2014/0359117 A1 | 12/2014 | Dare et al. |
| 2014/0366015 A1 | 12/2014 | Dobson et al. |
| 2014/0379567 A1 | 12/2014 | Schentrup et al. |
| 2015/0026827 A1 | 1/2015 | Kao et al. |
| 2015/0074057 A1 | 3/2015 | Brown et al. |
| 2015/0081644 A1 | 3/2015 | Pitts |
| 2015/0082191 A1 | 3/2015 | Dietz |
| 2015/0087270 A1 | 3/2015 | Richardson et al. |
| 2015/0113502 A1 | 4/2015 | Wade |
| 2015/0113506 A1 | 4/2015 | Wade |
| 2015/0135160 A1 | 5/2015 | Gauvin et al. |
| 2015/0138945 A1 | 5/2015 | Carrillo |
| 2015/0149232 A1 | 5/2015 | Dietz |
| 2015/0206451 A1 | 7/2015 | Schultz |
| 2015/0227115 A1 | 8/2015 | Dietz |
| 2015/0277941 A1 | 10/2015 | Dobson et al. |
| 2015/0341362 A1 | 11/2015 | Dobson et al. |
| 2015/0378581 A1 | 12/2015 | Dietz |
| 2015/0379475 A1 | 12/2015 | Dietz |
| 2016/0057559 A1 | 2/2016 | Deasy et al. |
| 2016/0156547 A1 | 6/2016 | Draluk et al. |
| 2016/0337844 A1 | 11/2016 | Hailpern |
| 2017/0244724 A1 | 8/2017 | Deasy et al. |

FOREIGN PATENT DOCUMENTS

| | | |
|---|---|---|
| CN | 1661610 A | 8/2005 |
| CN | 1708751 A | 12/2005 |
| CN | 1713199 A | 12/2005 |
| CN | 1849774 A | 10/2006 |
| CN | 1894897 A | 1/2007 |
| CN | 1951060 A | 4/2007 |
| CN | 101170401 A | 4/2008 |
| CN | 101305378 A | 11/2008 |
| CN | 101322379 A | 12/2008 |
| CN | 101350814 A | 1/2009 |
| CN | 101453708 A | 6/2009 |
| CN | 101572678 A | 11/2009 |
| CN | 101588353 A | 11/2009 |
| CN | 101727274 A | 6/2010 |
| CN | 101888597 A | 11/2010 |
| CN | 102422553 A | 4/2012 |
| CN | 102541635 A | 7/2012 |
| CN | 102591802 A | 7/2012 |
| CN | 102986190 A | 3/2013 |
| CN | 103299658 A | 9/2013 |
| CN | 104854561 A | 8/2015 |
| EP | 1465039 A1 | 10/2004 |
| EP | 2028805 A1 | 2/2009 |
| EP | 2403211 A1 | 1/2012 |
| EP | 2428894 A1 | 3/2012 |
| EP | 2523107 A1 | 11/2012 |
| EP | 2573701 A1 | 3/2013 |
| GB | 2411320 A | 8/2005 |
| GB | 2462442 A | 2/2010 |
| GB | 2478653 A | 9/2011 |
| JP | 11-205380 | 7/1999 |
| JP | 2003-296210 A | 10/2003 |
| JP | 2006-094258 A | 4/2006 |
| JP | 2006155522 A | 6/2006 |
| JP | 2007215201 A | 8/2007 |
| JP | 2008-033751 A | 2/2008 |
| JP | 2008-097419 A | 4/2008 |
| JP | 2008-160753 A | 7/2008 |
| JP | 2008-527574 A | 7/2008 |
| JP | 2009-070073 A | 4/2009 |
| JP | 2009-520409 A | 5/2009 |
| JP | 2009169661 A | 7/2009 |
| JP | 2009-289164 A | 12/2009 |
| JP | 2010-015601 A | 1/2010 |
| JP | 2010-079901 A | 4/2010 |
| JP | 2011-138446 A | 7/2011 |
| JP | 2011-191897 A | 9/2011 |
| JP | 2011-248888 A | 12/2011 |
| JP | 2013-058223 A | 3/2013 |
| KR | 10-0806993 B1 | 2/2008 |
| KR | 2012-0118819 A | 10/2012 |
| KR | 10-2012-0128376 A | 11/2012 |
| WO | 9914652 A1 | 3/1999 |
| WO | 02084460 A2 | 10/2002 |
| WO | 2004107646 A1 | 12/2004 |
| WO | 2006/012612 A1 | 2/2006 |
| WO | 2006136660 A1 | 12/2006 |
| WO | 2007113709 A1 | 10/2007 |
| WO | 2008086611 A1 | 7/2008 |
| WO | 2009021200 A1 | 2/2009 |
| WO | 2009/157493 A1 | 12/2009 |
| WO | 2010054258 A1 | 5/2010 |
| WO | 2010115289 A1 | 10/2010 |
| WO | 2013020177 A1 | 2/2013 |
| WO | 2013054296 A2 | 4/2013 |
| WO | 2013070813 A1 | 5/2013 |
| WO | 2014/032051 A1 | 2/2014 |
| WO | 2015/023887 A1 | 2/2015 |

OTHER PUBLICATIONS

Aug. 1, 2012—Teresa P. Lopes et al: "TPS development using the Microsoft .NET framework", IEEE Instrumentation & Measurement Magazine, IEEE Service Center, Piscataway, NJ; US, vol. 15, No. 4, pp. 34-39, XP011456193, ISSN: 1094-6969, DOI: 10.1109/MIM.2012.6263982, the whole document.

Apr. 28, 2003—Kate Gregory: "Managed, Unmanaged, Native: What Kind of Code is This?", Developer.com, pp. 1-3, XP055096991, retrieved from the Internet: <URL:http://www.developer.com/print.php/2197621>, [retrieved on Jan. 17, 2014], the whole document.

Feb. 10, 2014—(PCT) Search Report—App PCT/US/2013/065245.

Aug. 1, 2012—"TPS Development Using the Microsoft .NET Framework", Teresa P. Lopes, IEEE Instrumentation & Measurement Magazine (vol. 15, No. 4).

Apr. 28, 2003—"Managed, Unamanaged, Native: What Kind of Good Is This?", Kate Gregory, Developer.com, Retrieved from Internet: http://www.developer.com/print.php/2197621.

Dec. 13, 2005—Lowe, "Application-Specific VPNs".

Nov. 26, 2013—International Search Report and Written Opinion in International Application No. PCT/US2013/060388.

Apr. 2012—Xuetao Wei, et al., "Malicious Android Applications in the Enterprise: What Do They Do and How Do We Fix It?,"? ICDE Workshop on Secure Data Management on Smartphones and Mobiles, 4 pages.

2012—Ranjan et al., "Programming Cloud Resource Orchestration Framework: Operations and Research Challenges", arvix.org, pp. 1-19.

2010—Na et al., "Personal Cloud Computing Security Framework," 2010 IEEE Asia-Pacific Computing Conference, pp. 671-675.

2003—Wilson et al., "Unified Security Framework", In proceedings of the 1st International Symposium on Information and Communication Technologies, pp. 500-505. Trinity College Dublin.

2003—Mysore et al., "The Liquid Media System—a Multi-Device Streaming Media Orchestration Framework", Ubicomp 2003 Workshop, pp. 1-4.

Feb. 4, 2014—International Search Report and Written Opinion in Application No. PCT/US2013/064349.

Jan. 21, 2014—International Search Report and Written Opinion in International Application No. PCT/US2013/063856.

Jan. 2013—Apple Inc., iPad User Guide for iOS 6.1 Software, Chapter 26, Accessibility, pp. 107-108.

Feb. 24, 2014—(PCT) International Search Report and Written Opinion—App PCT/US2013/060379.

Mar. 6, 2014—International Search Report and Written Opinion in International Application No. PCT/US2013/064319.

(56) References Cited

OTHER PUBLICATIONS

Feb. 6, 2014—International Search Report and Written opinion in International Application No. PCT/US2013/064076.
Mar. 17, 2014—International Search Report and Written Opinion in International Application No. PCT/US2013/064279.
Apr. 4, 2014—International Search Report and Written Opinion in International Application No. PCT/US2013/063429.
Jul. 31, 2013—"Citrix XenMobile Technology Overview: White Paper," Citrix White Papers online, pp. 1-14; retrieved from http://insight.com/content/aam/insight/en_US/pdfs/citrix/xenmobile-tech-overview.pdf, retrieved Jan. 27, 2014.
Jun. 3, 2014—Search Report and Written Opinion issued in International Application No. PCT/US2013/060047.
Jul. 1, 2011—Wright et al., "Your Firm's Mobile Devices: How Secure are They?" Journal of Corporate Accounting and Finance, Willey Periodicals. pp. 13-21.
Oct. 20, 2014—(PCT) International Search Report—App PCT/US2014/036382.
Sep. 29, 2014—(PCT) International Search Report—App PCT/US2014/036326.
Dec. 20, 2013—(PCT) International Search Report and Written Opinion—App PCT/US2013/063363.
Jul. 11, 2014—(PCT) Written Opinion and International Search Report—App PCT/US13/63261.
2011—Laverty, Joseph Packy et al., "Comparative Analysis of Mobile Application Development and Security Models," Issues in Information Systems vol. XII, No. 1, [Retrieved from the Internet] <http://iacis.org/iis/2011/301-312_AL2011_1694.pdf> pp. 301-312.
2012—Potharaju, Rahul et al., "Plagiarizing smartphone applications: attack strategies and defense techniques," [Online] Engineering Secure Software and Systems, Springer Berlin Heidelberg, [Retrieved from the Internet] <http://link.springer.com/chapter/10.1007/978-3-642-28166-2_11#> pp. 106-120.
1998—Peine, H., "Security concepts and implementation in the Ara mobile agent system," [Online] 1998, Enabling Technologies: Infrastructure for Collaborative Enterprises, Seventh IEEE International Workshops on Jun. 17-19, 1998, [Retrieved from the Internet] <http://ieeexplore.ieee.org/stamp/stamp.jsp?tp=&arnumber=725699&isnumber=15665> pp. 236-242.
2006—Shah et al., "Securing Java-Based Mobile Agents through Byte Code Obfuscation Techniques," [Online] Dec. 23-24, 2006, Multitopic Conference, 2006, INMIC '06. IEEE, [Retrieved from the Internet] <http://ieeexplore.ieee.org/stamp/stamp.jsp?tp=&arnumber=4196425&isnumber=414013> pp. 305-308.
2008—Administration Guide for Symantec Endpoint Protection and Symantec Network Access Control; Retrieved from the Internet <<URL:ftp.symantec.com/public/english_us_canada/products/symantec_endpoint_protection/11.0/manuals/administration_guide.pdf>; pp. 1-615.
2007—Symantec Network Access Control Enforcer Implementation Guide; Retrieved from the Internet <URL:ftp.symantec.com/public/english_us_canada/products/symantec_network_access_control/11.0/manuals/enforcer_implementation_guide.pdf>; pp. 1-132.
Mar. 25, 2016—(CN) Office Action—App 201380057326.1.
2005—Hamed, H. et al., "Modeling and verification of IPSec and VPN security policies," 13th IEEE International Conference on Network Protocols (ICNP'05), pp. 10.
Nov. 2004—Skarmeta, A. et al., "Policy-based dynamic provision of IP services in a secure VPN coalition scenario," in IEEE Communications Magazine, vol. 42, No. 11, pp. 118-124.
Jun. 20, 2016—(EP) Extended European Search Report—App 13795317.
Nov. 13, 2015—International Search Report and Written Opinion of International Application No. PCT/US2015/026781.
Mar. 11, 2008—Vejda, T. et al., "Towards Trust Services for Language-Based Virtual Machines for Grid Computing," Trusted Computing—Challenges and Applications, ISBN: 978-3-540-68978-2.
Jul. 7, 2016—(EP) Supplementary European Search Report—App 13795317.0.
Jul. 29, 2016 (KR) Office Action—App. 10-2015-7031152.
Symantec: "What are Managed Applications and What is the Difference Between Assigned and Published;" Jan. 7, 2002; pp. 1-5.
Tilakgovind: "Understanding the Difference Between .exe and .msi: Symantec Connect" Jan. 15, 2008.
Oct. 11, 2016—International Search Report and Written Opinion—App No. PCT/US2016/039229.
Nov. 1, 2016 (KR) Office Aciton—App. 10-2012-7001062.
Oct. 28, 2016 (JP) Notice of Reasons for Refusal—App. 2016-505458.
Ikuki Matsuhisa, Telecommunication, RIC TELECOM, Sep. 25, 2011, vol. 28, No. 10, p. 66-69.
Jan. 19, 2017 (JP) Notification of Reasons for Refusal—App. 2016-505456.
Feb. 21, 2017 (CN) First Chinese Office Action—App. 2013800657267.
Feb. 8, 2017—(CN) First Office Action—App No. 2013800641911—Eng Trans.
Mar. 3, 2017—(CN) First Office Action—App 201380065897X.
Jan. 12, 2009—"Safeguarding removable-media devices," Sever.
Aug. 25, 2011—"A mobile and portable trusted computing platform," Nepal et al.
Sep. 2003—"Securing wireless access to mobile applications," Phifer.
2009—"Policy-Based Security Configuration Management Application to Intrusion Dection and Prevention," Alsubhi, Khalid et al., pp. 1-6.
Mar./Apr. 2002—"Simplifying Network Administration Using Policy-Based Management," Verma, Dinesh C. et al.
2004—"Policy Transformation Techniques in Policy-based Systems Management," Beigi, Mandis S., et al., pp. 1-10.
2006—"Middleware Support for Auditing Service Process Flows," Hacigumus, Hakan, pp. 24-29.
Oct. 2005"Policy-Based Management of Networked Computing Systems," Agrawal, Dakshi et al., pp. 69-75.
Nov./Dec. 1999—"Conflicts in Policy-Based Distributed Systems Management," Lupu, Emil et al., pp. 852-869.
Nov. 10, 2016 (JP) Notification of Reason for Refusal—App. 2016-505457.
Oct. 14, 2016—(KR) Office Action—App 10-2015-7031149.
Nov. 5, 2015—(EP) Communication Under Rules 61 and 62—App. 13773923.1.
Sep. 26, 2019—(US) Final Office Action—U.S. Appl. No. 15/960,868.
Jun. 13, 2019—(US) Final Office Action—U.S. Appl. No. 14/055,038.
May 13, 2019 (EP) Examination Report—App. 13780486.0.
Oct. 24, 2019 (IN) First Examination Report—App. 2601/CHENP/2015.
Oct. 23, 2018 (EP) Extended European Search Report and Written Opinion—App. 18185793.9.
Oct. 25, 2018—(US) Non-final Office Action—U.S. Appl. No. 15/957,642.
Jan. 14, 2019—(US) Notice of Allowance—U.S. Appl. No. 14/021,227.
General review of latest approaches for BYOD Safely use business apps from personal terminal, Nikkei Communication, Nikkei Business Publications, Inc., Jun. 1, 2012, No. 581, pp. 27-37.
Mar. 9, 2018—(US) Non-final Office Action—U.S. Appl. No. 14/021,227.
Dec. 2, 2015—(US) Non-Final Office Action—U.S. Appl. No. 14/021,227.
Mar. 27, 2018—(US) Final Office Action—U.S. Appl. No. 15/057,314.
Apr. 19, 2018—(US) Non-final Office Action—U.S. Appl. No. 15/863,853.
Mar. 30, 2018—(US) Final Office Action—U.S. Appl. No. 14/055,038.
Jun. 8, 2018—(US) Notice of Allowance—U.S. Appl. No. 15/140,683.
Jun. 28, 2018—(US) Non-final Office Action—U.S. Appl. No. 15/946,692.
Sep. 14, 2018—(US) Non-final Office Action—U.S. Appl. No. 15/057,314.
Sep. 20, 2018—(US) Final Office Action—U.S. Appl. No. 14/021,227.
Nov. 29, 2018—(US) Non-final Office Action—U.S. Appl. No. 14/055,038.

(56) References Cited

OTHER PUBLICATIONS

Hana K. Rubinsztejn et al., "Support for Context-Aware Collaboration," in "Serious Games," Jan. 1, 2004, Springer International Publishing, Cham, XP055522503, ISSN: 0302-9743, ISBN: 978-3-030-02761-2, vol. 3284, pp. 37-47, 2004.
Jan. 11, 2019—(US) Final Office Action—U.S. Appl. No. 15/946,692.
Nov. 5, 2015—(EP) Office Action—App 13773923.1.
Jan. 10, 2019—(JP) Notification of Reasons for Refusal—App 2017-550935, Eng Tran.
Feb. 8, 2019—(EP) Examination Report—App 13 779 9763.
May 22, 2019 (EP) Extended European Search Report—App. 19152128.5.
May 29, 2019—(US) Final Office Action—U.S. Appl. No. 15/957,642.
Jun. 3, 2019—(US) Notice of Allowance—U.S. Appl. No. 15/057,314.
Jul. 4, 2019 (EP) Extended European Search Report—App. 19168479.4.
Jul. 10, 2019—(US) Notice of Allowance—U.S. Appl. No. 15/946,692.
Jan. 7, 2019—(EP) Notice of Allowance—App. 13773923.1.
Aug. 1, 2019—(EP) Extended European Search Report—App. 19172024.2.
Sep. 19, 2019 (IN) First Examination Report—App. 2158/CHENP/2015.
Sep. 18, 2019—(US) Non-final Office Aciton—U.S. Appl. No. 16/295,273.
Sep. 30, 2019—(US) Notice of Allowance—U.S. Appl. No. 15/957,642.
Sep. 12, 2019—(JP) Notice of Allowance—App 2017-550935.
Oct. 1, 2019—(EP) Notice of Allowance—App 15722806.5.
Sep. 25, 2019 (EP) Communication pursuant to Article 94(3) EPC—App. 18185793.9.
Oct. 29, 2019 (IN) First Examination Report—App. 6657/CHENP/2015.
Nov. 29, 2019—(IN) Examination Report—App 2751/CHENP/2015.
Jan. 9, 2020 (US) Non-final Office Action—U.S. Appl. No. 15/960,868.
Nov. 25, 2019—(IN) Examination Report—App No. 6632/CHEN/2015.
Dec. 11, 2019—(JP) Decision of Refusal—App 2018-189820.
International Search Report received in PCT/US2014/036326 dated Sep. 29, 2014.
Dec. 30, 2019—(CN) Office Action—App 201710937723.8.
Jan. 23, 2020 (IN) First Examination Report—App. 6625/CHENP/2015.
Jan. 24, 2020 (EP) Examination Report (Communication pursuant to Article 94(3))—App. 19152128.5.
Jan. 31, 2020 (IN) First Examination Report—App. 6626/CHENP/2015.
Dec. 31, 2019—(IN) Examination Report—App 2698/CHENP/2015.
Feb. 20, 2020—(US) Notice of Allowance—U.S. Appl. No. 16/567,238.
Mar. 11, 2020—(US) Final Office Action—U.S. Appl. No. 16/295,273.
May 5, 2020 (US) Advisory Action—U.S. Appl. No. 16/401,588.
May 26, 2020—(US) Non-final Office Action—U.S. Appl. No. 14/055,038.
Jun. 8, 2020—(US) Advisory Action—U.S. Appl. No. 16/295,273.
Jun. 9, 2020—(US) Final Office Action—U.S. Appl. No. 15/960,868.
Jun. 23, 2020—(US) Non-final Office Action—U.S. Appl. No. 16/401,588.
Jun. 23, 2020 (EP) Examination Report—App. 18186906.6.
Jun. 17, 2020 (EP) Examination Report—App EP18186904.1.
Jul. 21, 2020 (EP) Extended European Search Report—App. 20179037.5.
International Search Report and Written Opinion for International App. No. PCT/US2013/065245, dated Feb. 10, 2014.
Citrix: "Citrix XenMobile Technology Overview White Paper"; Citrix White papers on line, Jul. 31, 2012 (Jul. 31, 2012), pp. 1-14, XP055098728, Retrieved from the Internet: URL:http://www.insight.com/content/dam/onsight/en_US/pdfs/citrix/xenmobile-tech-overview.pdf, [retrieved on Jan. 27, 2014] the whole document.
Teresa P. Lopes et al: "TPS development using the Microsoft .NET framework", IEEE Instrumentation & Measurement Magazine, IEEE Service Center, Piscataway, NJ; US, vol. 15, No. 4, Aug. 1, 2012 (Aug. 1, 2012), pp. 34-39, XP011456193, ISSN: 1094-6969, DOI: 10.1109/MIM.2012.6263982, the whole document.
Kate Gregory: "Managed, Unmanaged, Native: What Kind of Code is This?", Developer.com, Apr. 28, 2003 (Apr. 28, 2003), pp. 1-3, XP055096991, retrieved from the Internet: <URL:http://www.developer.com/print.php/2197621>, [retrieved on Jan. 17, 2014], the whole document.
Statement RE: Related Application, dated Oct. 7, 2015.

* cited by examiner

APPLICATION WRAPPING FOR APPLICATION MANAGEMENT FRAMEWORK

CROSS-REFERENCE TO RELATED APPLICATIONS

This application is a continuation of and claims priority to U.S. patent application Ser. No. 14/055,078, filed Oct. 16, 2013, and entitled "APPLICATION WRAPPING FOR APPLICATION MANAGEMENT FRAMEWORK," which claims priority to U.S. Provisional Patent Application Ser. No. 61/825,384, filed May 20, 2013, and entitled "APPLICATION DEVELOPMENT, DISTRIBUTION, AND EXECUTION," and U.S. Provisional Patent Application Ser. No. 61/714,469, filed Oct. 16, 2012, and entitled, "POLICY-BASED CONTROL OF A MANAGED APPLICATION DERIVED FROM AN UNMANAGED APPLICATION," to each of which this application is entitled and claims priority; the disclosures of each of the foregoing are incorporated by reference herein in their entirety.

TECHNICAL FIELD

Aspects described herein generally relate to software applications for mobile devices and other computing devices. More specifically, certain aspects described herein provide approaches for developing, distributing, and executing applications.

BACKGROUND

Mobile devices, such as smart phones, personal digital assistants, tablet computers, other types of mobile computing devices, are becoming increasingly popular. Mobile devices are used in personal and business settings for a variety of purposes. Users of mobile devices may want their devices to be personal and interactive, and suitable both as personal consumer devices and as business devices, and will often customize their mobile devices by installing various mobile software applications suitable to their purposes. Mobile software applications are developed and distributed from a variety of different sources, such as companies developing mobile business applications for their employees, or independent software vendors (ISVs) developing mobile consumer applications for public consumers. Software applications may be published and distributed through application stores, such as public application stores or non-public enterprise application stores.

BRIEF SUMMARY

The following presents a simplified summary of various aspects described herein. This summary is not an extensive overview, and is not intended to identify key or critical elements. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards modifying software components, such as native mobile applications or template applications, into managed mobile applications. Metadata associated with the managed mobile application may be generated, and the managed mobile applications and associated metadata may be provided to users via one or more application stores. In certain examples, a native mobile application may be modified into a managed mobile application by determining a structure of the native mobile application, and inserting code into the native mobile application, and rebuilding the native mobile application. In some examples, a template application, such as a web application template or a hosted enterprise application template, also may be modified into a managed mobile application and customized for specific uses and purposes.

According to additional aspects, a managed mobile application may be provided to a first application store, such as a public application store, and the metadata associated with the managed mobile application may be provided to a second application store, such as an enterprise application store. According to further aspects, managed mobile applications and/or associated metadata may be retrieved (e.g., downloaded) by mobile devices from one or more application stores, such as public application stores and enterprise application stores. In certain examples, a mobile device may retrieve metadata associated with a managed mobile application from an enterprise application store, and may use the metadata to retrieve the managed mobile application from a public application store.

In accordance with one or more aspects, a stub for a proxy of an operating system (OS) application program interface (API) call may be generated. Policy enforcement logic may be inserted into the stub for the proxy of the OS API call. Code of an application may be parsed to identify one or more calls corresponding to the OS API call. The one or more calls corresponding to the OS API call may be replaced with a reference to the stub for the proxy of the OS API call. In some embodiments, at least a portion of the code of the application and code comprising the policy enforcement logic may be merged into a common file.

In some embodiments, parsing the code of the application to identify the one or more calls corresponding to the OS API call may include parsing bytecode of the application to identify one or more portions of the bytecode of the application that correspond to the OS API call. The bytecode of the application may be configured for execution by a process virtual machine run on the OS.

In some embodiments, the OS API call may be a call to a method of the OS API, and the proxy for the OS API call may include a call corresponding to the method of the OS API. In such embodiments, the policy enforcement logic may include one or more conditions for determining whether the call corresponding to the method of the OS API should be invoked. The stub for the proxy of the OS API call may have a return type that corresponds to a return type of the OS API call and/or one or more parameters that correspond to parameters of the OS API call. The application may invoke the reference to the stub for the proxy of the OS API call. A value for each of the one or more parameters corresponding to parameters of the OS API call may be received from the application. A device running the OS and the application may execute the policy enforcement logic to determine whether the call corresponding to the method of the OS API should be invoked. In response to determining that the call corresponding to the method of the OS API should be invoked, the call corresponding to the method of the OS API may be invoked. The value for each of the one or more parameters corresponding to parameters of the OS API call may be passed to the method of the OS API, and a value of the return type of the OS API call may be received from the method of the OS API. The value of the return type of the OS API call may be returned to the application by the proxy of the OS API call. In response to determining that the call corresponding to the method of the OS API should not be invoked, the call corresponding to the method of the OS API may fail to be invoked, the value for each of the one or more parameters corresponding to parameters of the OS API call may fail to be passed to the method of the OS API, and a predetermined value of the return type of the OS API call may be returned to the application by the proxy of the OS API call.

In some embodiments, the OS API call may be a call to a class of the OS API, and the proxy for the OS API call may include a call to a class that extends the class of the OS API. The application may invoke the reference to the stub for the proxy of the OS API call, and an instance of the class that extends the class of the OS API may be instantiated. The class that extends the OS API may include an instance of the class of the OS API and the policy enforcement logic. The policy enforcement logic may include one or more conditions for determining whether a call to a method of the instance of the class of the OS API should be invoked. A device running the OS and the application may execute the policy enforcement logic to determine whether the call to the method of the instance of the class of the OS API should be invoked. In response to determining that the call to the method of the instance of the class of the OS API should be invoked, the method of the instance of the class of the OS API may be invoked. In response to determining that the call to the method of the instance of the class of the OS API should not be invoked, the method of the instance of the class of the OS API may fail to be invoked.

In some embodiments, the policy enforcement logic may include one or more calls to a policy enforcement class that includes one or more methods for determining whether a call by the application to the OS API should be invoked. The method(s) for determining whether the call by the application to the OS API should be invoked may include a method for determining whether a call by the application to the OS API for cutting, copying, or pasting data to or from a clipboard of the OS should be invoked. Additionally or alternatively, the method(s) for determining whether the call by the application to the OS API should be invoked may include a method for determining whether a call by the application to the OS API for browsing to a specified uniform resource locator (URL) should be invoked, a method for determining whether a call by the application to the OS API for geographical location information accessible to the OS, camera data accessible to the OS, or microphone data accessible to the OS should be invoked, and/or a method for determining whether a call by the application to the OS API for composing an email message or a short messaging service (SMS) message should be invoked.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards developing, modifying, and distributing software applications for enterprise systems. Software components, such as native mobile applications or template applications, may be modified into managed mobile applications, and metadata associated with the managed mobile applications may be generated. The managed mobile applications and associated metadata may be provided to various application stores, such as public application stores and/or enterprise application stores. From the application stores, the managed mobile applications and/or associated metadata may be retrieved by mobile devices, and may be executed as managed applications in an enterprise system.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
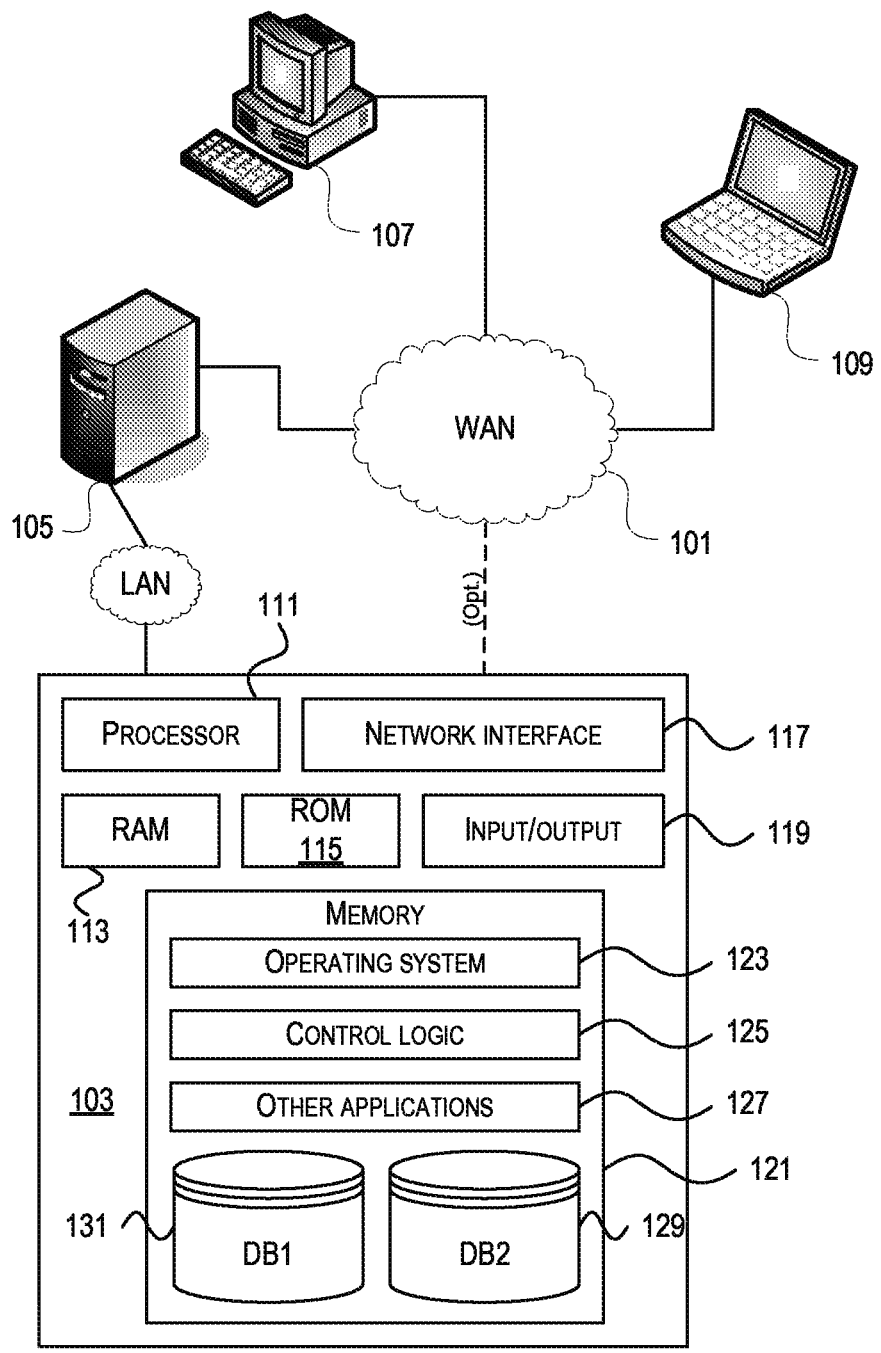
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MANs) wireless networks, personal networks (PANs), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
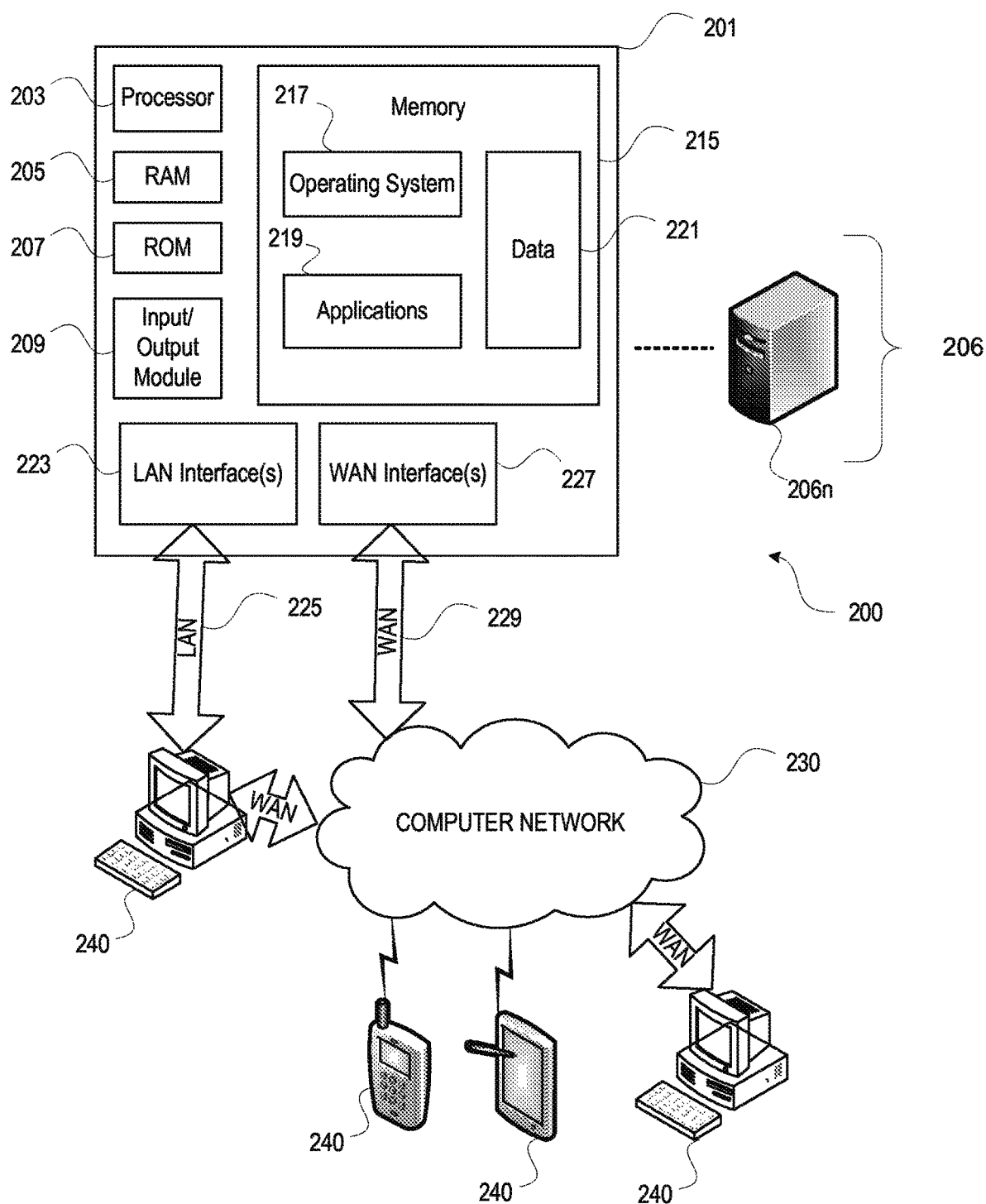
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. For example, generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute an application management agent (or client agent program or application) to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the requests to a second server 206b, and responds to the requests generated by the client machine 240 with a response from the second server 206b. First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture which may be illustrative of a desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

When utilized in a desktop virtualization system, server 206 may be configured as a virtualization server in a virtualization environment, for example, a single-server, multi-server, or cloud computing environment. In such embodiments, the virtualization server 206 may include a hardware layer including one or more physical disks, physical devices, physical processors, and physical memories. The memory 215 of the virtualization server 206 may include firmware, an operating system, and a hypervisor (e.g., a Type 1 or Type 2 hypervisor) configured to create and manage any number of virtual machines. A virtual machine is a set of executable instructions that, when executed by a processor, imitate the operation of a physical computer such that the virtual machine can execute programs and processes much like a physical computing device. The hypervisor may provide each virtual machine with a virtual view of the physical hardware, memory, processor and other system resources available to that virtual machine.

Some aspects described herein may be implemented in a cloud-based environment. In such environments, client devices 240 may communicate with one or more cloud management servers 206 to access the computing resources (e.g., host servers, storage resources, and network resources) of the cloud system. Cloud management servers 206 may manage various computing resources, including cloud hardware and software resources, and may provide user interfaces through which cloud operators and cloud customers may interact with the cloud system. For example, management servers 206 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. Management servers 206 also may include a set of APIs and/or one or more customer console applications with user interfaces configured to receive cloud computing requests from end users via client computers 240, for example, requests to create, modify, or destroy virtual machines within the cloud. Client computers 240 may connect to management server 206 via the Internet or other communication network, and may request access to one or more of the computing resources managed by management server 206. In response to client requests, the management server 206 may include a resource manager configured to select and provision physical resources in the hardware layer of the cloud system based on the client requests. For example, the management server 206 and additional components of the cloud system may be configured to provision, create, and manage virtual machines and their operating environments (e.g., hypervisors, storage resources, services offered by the network elements, etc.) for customers at client computers 240, over a network (e.g., the Internet), providing customers with computational resources, data storage services, networking capabilities, and computer platform and application support. Cloud systems also may be configured to provide various specific services, including security systems, development environments, user interfaces, and the like.

Cloud computing environments also may include a virtualization layer with additional hardware and/or software resources configured to create and manage virtual machines and provide other services to customers using the physical resources in the cloud. The virtualization layer may include hypervisors, as described above, along with other components to provide network virtualizations, storage virtualizations, etc. The virtualization layer may be as a separate layer from the physical resource layer, or may share some or all of the same hardware and/or software resources with the physical resource layer.

Enterprise Mobility Management Architecture

Figure 3:
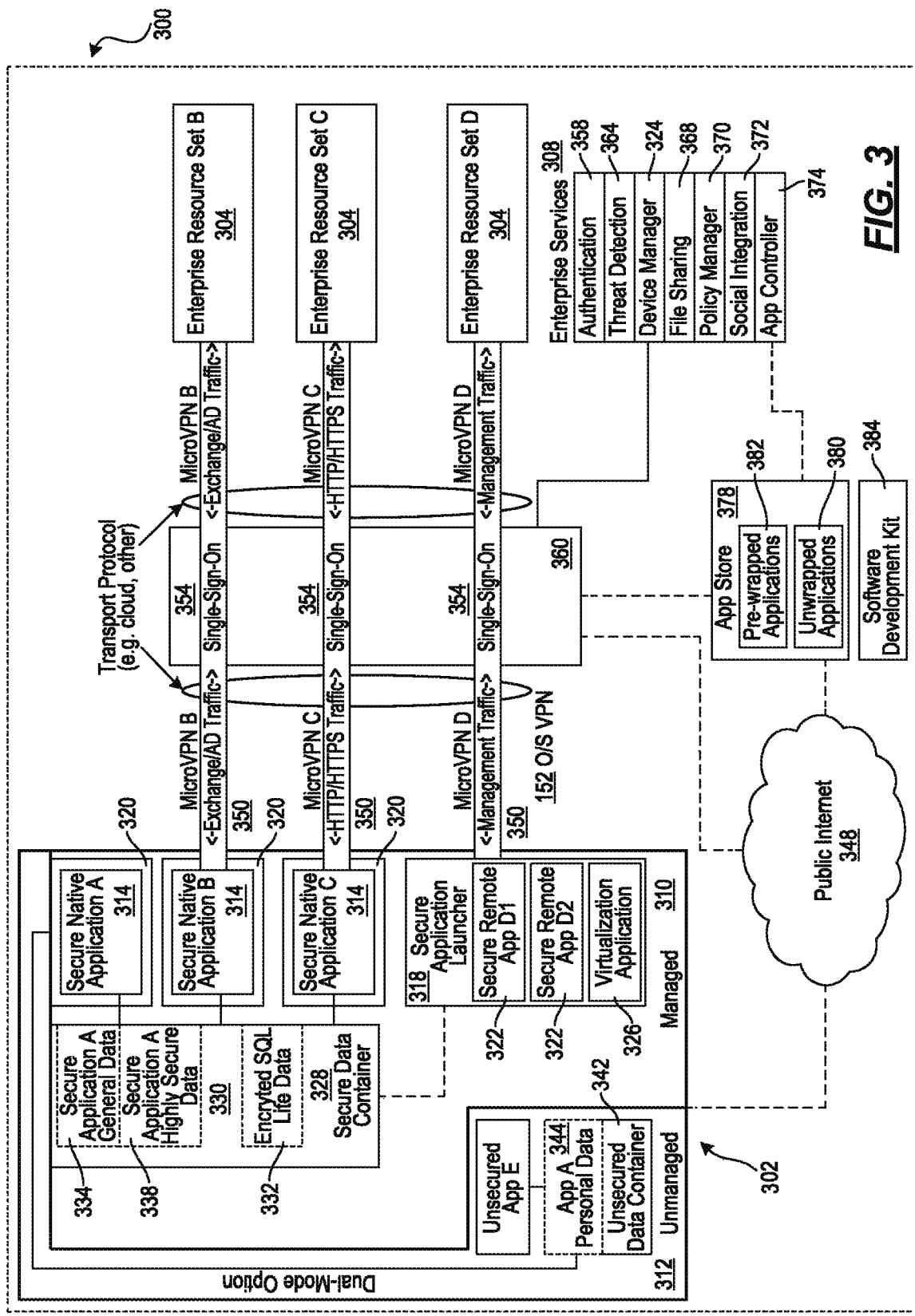
FIG. 3 depicts an illustrative enterprise mobility management system in accordance with one or more illustrative aspects described herein.

FIG. 3 represents an enterprise mobility technical architecture 300 for use in a BYOD environment. The architecture enables a user of a mobile device 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to the user. The user may utilize the mobile device 302 for business use only or for business and personal use. The mobile device may run an iOS operating system, Android operating system, and/or the like. The enterprise may choose to implement policies to manage the mobile device 304. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device or a managed device.

In some embodiments, the operating system of the mobile device may be separated into a managed partition 310 and an unmanaged partition 312. The managed partition 310 may have policies applied to it to secure the applications running on and data stored in the managed partition. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The applications running on the managed partition may be secure applications. The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The secure applications may access data stored in a secure data container 328 in the managed partition 310 of the mobile device. The data secured in the secure data container may be accessed by the secure wrapped applications 314, applications executed by a secure application launcher 322, virtualization applications 326 executed by a secure application launcher 322, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as AES 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured mode. In an unsecured mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections (also referred to as microVPN or application-specific VPN) may be specific to particular applications 350, particular devices, particular secured areas on the mobile device, and the like (e.g., 352). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use user interface. The application store 378 may provide access to a software development kit 384. The software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
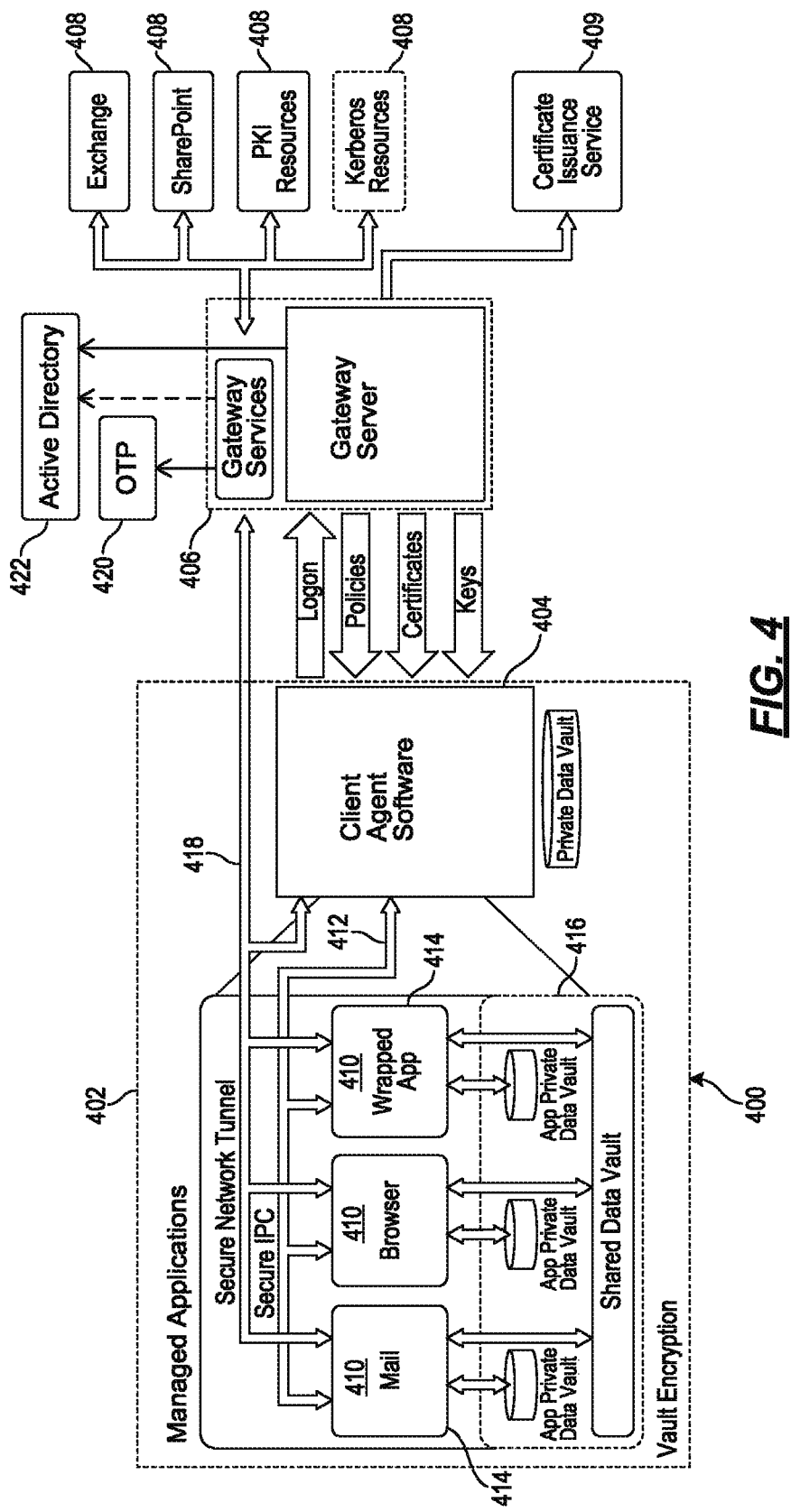
FIG. 4 depicts another illustrative enterprise mobility management system in accordance with one or more illustrative aspects described herein.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled/managed mobile device 402 with a client agent 404, which interacts with gateway server 406 (which includes access gateway and application controller functionality) to access various enterprise resources 408 and services 409 such as Exchange, Sharepoint, PKI Resources, Kerberos Resources, and Certificate Issuance Service, as shown on the right hand side above. Although not specifically shown, the mobile device 402 may also interact with an application store for the selection and downloading of applications.

The client agent 404 acts as the UI (user interface) intermediary for Windows apps/desktops hosted in an Enterprise data center, which are accessed using a display remoting protocol, such as but not limited to the ICA protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and the application management framework (AMF) of this architecture act to provide policy driven management capabilities and features such as connectivity and SSO (single sign on) to enterprise resources/services 408. The client agent 404 handles primary user authentication to the enterprise, normally to the access gateway (AG) with SSO to other gateway server components. The client agent 404 obtains policies from gateway server 406 to control the behavior of the AMF managed applications 410 on the mobile device 402.

The secure IPC links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through the access gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The mail and browser managed applications 410 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 406 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password. When data is stored locally on the device 402 in the secure container 416, it is preferred that a minimum of AES 256-bit encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want the enterprise application store to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via a micro VPN feature). For example, an application such as @WorkMail may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for the application management framework to mediate HTTPS requests).

Client certificate support on iOS may rely on importing a PKCS 12 BLOB (Binary Large Object) into the iOS keychain in each managed application for each period of use. Client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to AD 422, using an AD password or trusted client certificate, and obtain Kerberos service tickets to respond to HTTP negotiate authentication challenges. The limited support feature relates to constrained delegation in AGEE, where AGEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of the enterprise application store and application controller may be supported that allows users to be serviced from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Application Development, Distribution, and Execution

Figure 5:
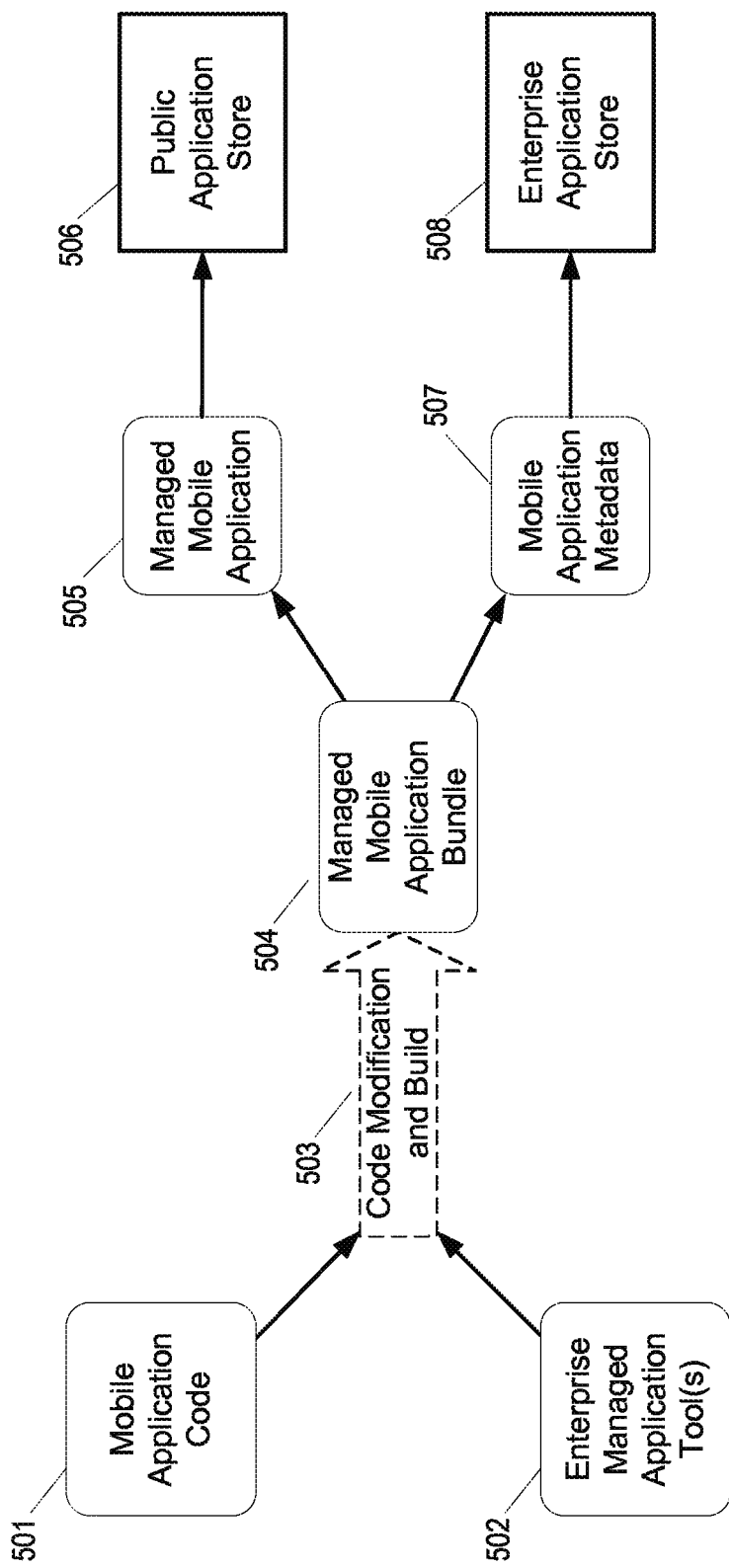
FIG. 5 is a diagram showing an example process of creating and distributing a managed mobile application and associated metadata to one or more application stores, in accordance with one or more illustrative aspects described herein.
Figure 6:
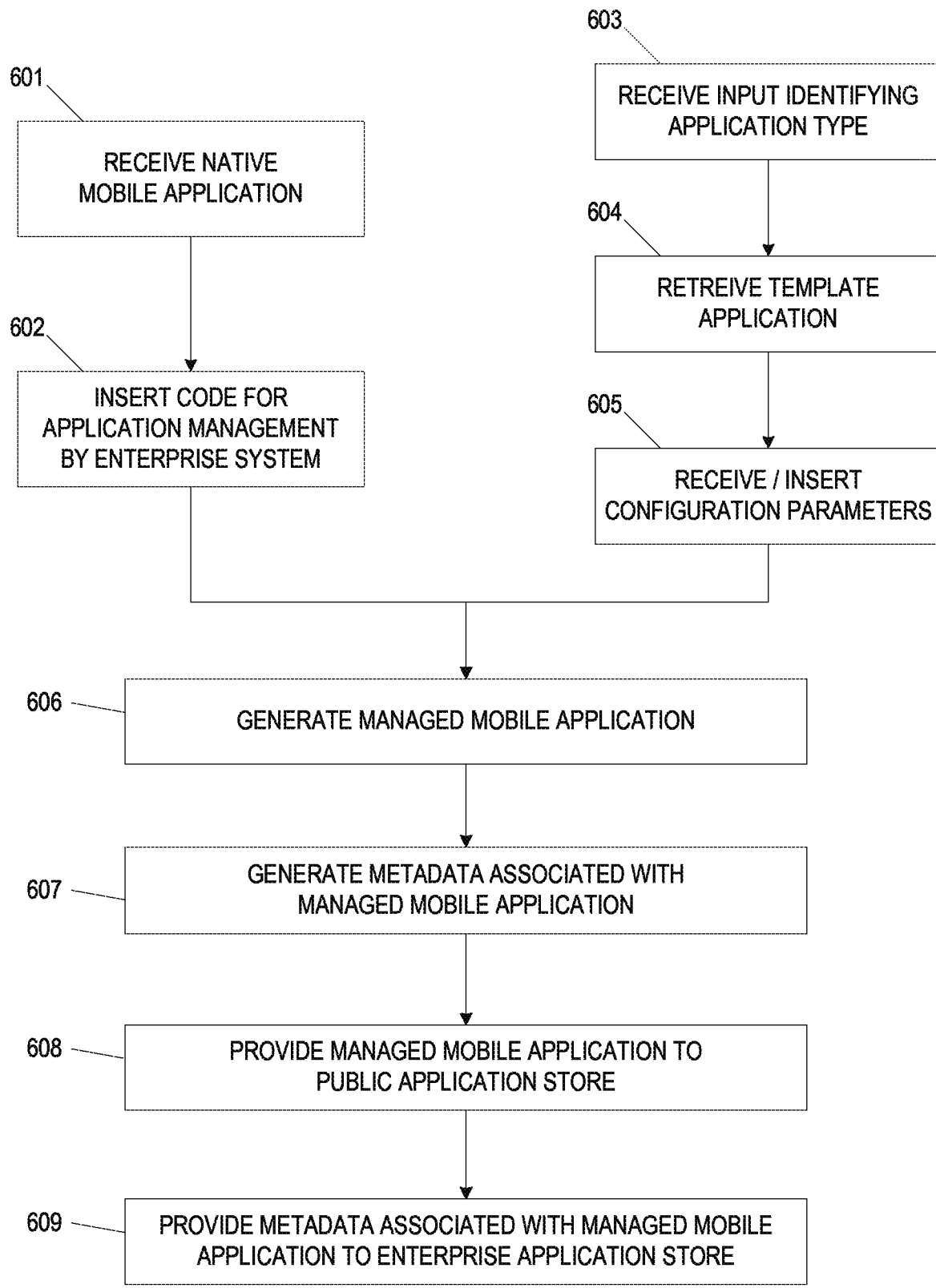
FIG. 6 is a flow diagram illustrating an example process of building and distributing a managed mobile application and associated metadata to one or more application stores, in accordance with one or more illustrative aspects described herein.
Figure 7:
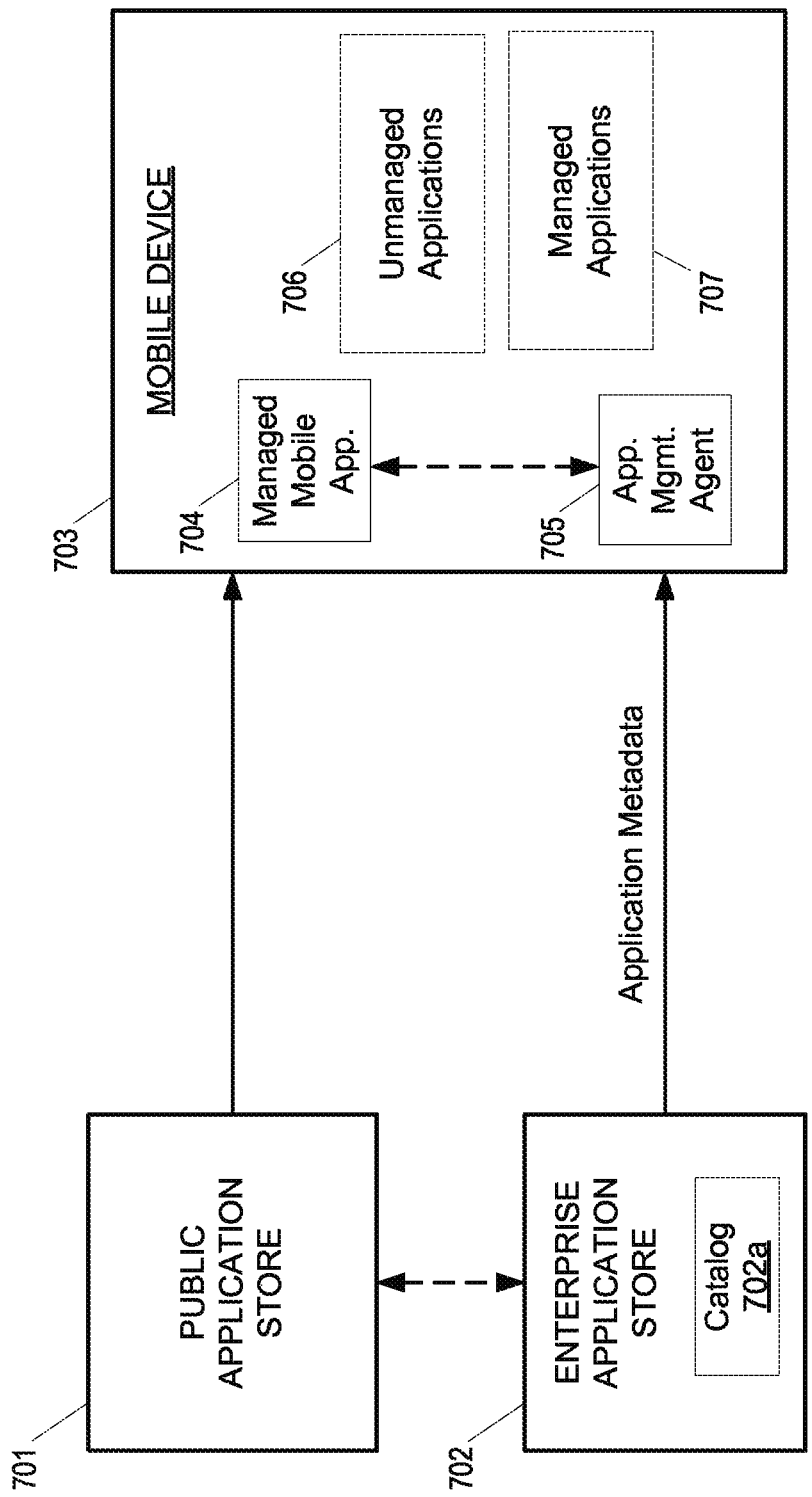
FIG. 7 is a diagram showing an example process of providing a managed mobile application to a mobile device, in accordance with one or more illustrative aspects described herein.

FIGS. 5-7, and the sections below, illustrate various embodiments and examples relating to developing, deploying, distributing, and executing managed applications. Some examples are described in reference to mobile applications for devices, such as mobile phones, personal digital assistants (PDAs), tablet, and laptop computers. For example, FIGS. 5-6 illustrate example processes of developing and distributing mobile applications, and FIG. 7 illustrates a process of providing a managed mobile application to a mobile device from an application store. However, it should be understood that the concepts described herein are not limited to mobile applications and mobile devices, but may be applied to other types of computing devices as well. For example, software applications may be developed for and distributed to personal desktop computers and other non-mobile computing devices, using similar (or the same) techniques described below for mobile applications and mobile devices. Applications also may be developed for and distributed to devices on other software platforms, such as television-based platforms (e.g., ANDROID applications for GOOGLE TV, etc.), automobile-based or vehicle-based software platforms, and the like, using similar or the same techniques described below for mobile applications and mobile devices (e.g., software development and modification tools, distribution via application stores, etc.).

Referring now to FIG. 5, an illustrative diagram is shown of a process of building a managed mobile application bundle and distributing components of the bundle to one or more application stores. The features and methods described below in reference to FIG. 5 may be performed by a computing device or combination of devices, such as the various computing devices and systems shown in FIGS. 1 and 2, and may be implemented within various different types of enterprise systems and other computing systems, such as the illustrative mobility management systems shown in FIGS. 3 and 4.

The illustrative build process shown in FIG. 5 accepts mobile application code 501 and enterprise managed application software tools 502. The mobile application code 501 in this example may correspond to one or more executable software components or to application code that has not been built into an executable component. For example, the mobile application code 501 may be an executable native mobile application built by an organization for use within the organization, or built and distributed by an independent software vendor (ISV). In such cases, the mobile application code 501 may correspond to a previously published executable application, which has been signed and certified for distribution through one or more application stores. Alternatively, the mobile application code 501 may be unbuilt software code, for example, code during an application development process. Additionally, as discussed below, the mobile application code 501 may correspond to a template application, such as a configurable stub application designed to allow users to easily create managed mobile applications for enterprise systems. Such template applications may themselves be executable applications (e.g., a generic or stub web browser application, a generic or stub single-session client execution environment application, etc.), or may take the form of a template application factored out into a binary software development kit (SDK).

The enterprise managed application software tools 502 in FIG. 5 may be a software toolkit provided to organizations, ISV's, or other software application developers. In some examples, the software toolkit 502 may include a header file and library to allow application developers to create managed mobile applications for enterprise systems. The toolkit 502 library may include application programming interfaces written in Object-C or other suitable programming language. In some cases, the software tools 502 may include a command-line executable tool 502 to generate an application package (e.g., a .IPA executable for APPLE mobile devices, a .APK executable for GOOGLE ANDROID mobile devices, etc.), and an associated metadata file. In other examples, the software tools 502 may include a wizard 502 or other user interface screens to allow users to specify managed application features for the application and metadata for publishing the application. In still other examples, the software tools 502 need not include a command-line tool or a wizard, but instead (or in addition to) may be implemented as a service. For example, a service 502 containing the functionality to update or convert a mobile software application to a managed mobile application may be integrated into the publishing flows of mobile applications.

During the code modification and build process 503 illustrated in FIG. 5, the enterprise managed application tools 502 may be used to modify mobile application code 501, before building (or rebuilding) the code into an executable managed mobile application. As noted above, the mobile application code 501 may correspond to an executable software component (e.g., a native mobile application, a template application, a binary SDK, etc.) or to unbuilt and not executable software code. Thus, if the mobile application code 501 is a executable application, the modification and build process 503 may include opening the existing application, modifying the application code 501 by inserting code to implement support for various managed application features (e.g., code for monitoring and controlling system interactions) and inserting various assets into the code (e.g., certificates, secrets, resources to manage the application, etc.). In contrast, if the mobile application code 501 is unbuilt and not executable software code, for example, if the mobile application code 501 if under development by an ISV or organization associated with an enterprise system, then the management code and/or configuration code may be inserted into the code without needing to first open the executable (e.g., binary) application package. Additionally, if the mobile application code 501 is a template application (e.g., a generic or stub application, or a binary SDK corresponding to a generic or stub application), then code to implement various managed application features might or might not already be included in the template. As discussed below, certain template applications may be preconfigured as managed mobile applications, but may be configured with specific parameters to define the constraints and policies of the managed application, as well as additional parameters to customize the user interface and other features of the application.

During the modification and build process 503 the enterprise managed application tool(s) 502 may be configured to add some or all of the functionalities that are found in wrapped mobile applications. For example, software tools 502 may be configured to add functionality for enterprise user authentication (e.g., via an application management agent and access gateway) to the mobile application code 501. The software tools 502 also may be configured to add functionality for authenticating the application via the application management agent (e.g., including application enumeration, subscription, downloading, and installation). The tools 502 may be configured to add application policy enforcement functionality, and to add lock and wipe functionality into the application code 501. The software tools 502 also may be configured to add support for micro-VPN and associated policies, as well as application containment and associated policies (e.g., managed OpenIn, secure pasteboard, location service, camera, and all other application containment features supported in wrapped applications) into the mobile application code 501. Additionally, the software tools 502 may be configured to add data encryption support and associated policies (e.g., SQL database encryption, file encryption, etc.) into the application code 501. The software tools 502 also may be configured to add support for secure communications between the mobile application and an application management agent into the mobile application code 501.

The code modification and building process 503 may be performed automatically by one or more software tools 502, or may include one or more steps involving user input and/or user interaction. In some examples, a software tool 502 may correspond to a command line utility or service that is capable of receiving application code 501 (in the form of one or more binary executables and/or source code), modifying the application code 501, and building the executable managed mobile application, all without needing any user interaction or input. In such examples, a build tool 502 (e.g., command line utility or software service) may implement a set of application management features and functionalities, such as those described above, including predetermined constraints and policies defining how the application will be monitored and controlled in an enterprise system. Examples of such constraints and policies include controlling what system resources and device hardware the application will be permitted to access, controlling what secure protocols or other network communication policies the application will be required to use, controlling the data encryption that the application will be required to use, and the like.

In some examples, user input and/or user interaction may be received and used during the process 503 of modifying the application code 501 and building the managed mobile application using software tool(s) 502. For example, a command line utility 502 may allow users to specify arguments that control the application management features and functionalities that will be inserted into the application code 501, and to specify the constraints and policies that will be implemented to control the application in an enterprise system (e.g., data encryption policies, secure communication policies, resource access constraints, etc.). The software tools 502 also may include a wizard 502 or other user interfaces to receive input from users (e.g., application developers or distributors, or enterprise system users converting mobile applications to managed application) specifying the application management features and functionalities to be applied to the managed application, including the constraints and policies that will control the application in an enterprise system. Additionally, as discussed in more detail below, user input and/or user interaction may be used to further customize the mobile application during the build process. For instance, user input may be received and used to customize the functional features, look and feel, and publication information of applications generated based on template applications (e.g., web-based applications and client execution environment applications).

After modifying the application code 501, the code may be compiled and built (or recompiled and rebuilt in the case of native mobile applications and the like) using one or more compilation and build software tools (e.g., the XCODE suite for developing iOS applications). The build process illustrated in FIG. 5 may include a testing/validation phase, in which some or all of the tests normally done during an application wrapping process may be performed. Such testing and validation may be performed on the software source code before the code is built (or rebuilt) into an executable application, and/or may be performed on the executable application after the compilation/build process. In some examples, additional testing and validation may be performed to ensure that the managed mobile application 505 is compatible with one or more enterprise systems. For instance, if a managed mobile application is intended to be offered and supported by an enterprise system, then a test utility may be used during or after the build process 503 to confirm that the application is compatible with the access gateway and/or infrastructure of the intended enterprise system. If the managed mobile application is not compatible with an intended enterprise system, then the system may determine that the application must be further modified and rebuilt, or that the application should be listed in the enterprise application store 508 or supported by the enterprise system.

As shown in FIG. 5, the process of modifying and building 503 the application code may produce a managed mobile application bundle 504. The managed mobile application bundle 504 may include one or more executable binaries for the application 505 (e.g., .IPA files for APPLE mobile devices, .APK files for GOOGLE ANDROID mobile devices, etc.), as well as one or more metadata files 507 associated with the application. In some examples, the metadata 507 describing or relating to an application may be used for publishing and policy control. The metadata files 507 (e.g., XML files, text files, or other metadata formats) may be automatically derived from the application code 501 or during the build process 503, and/or may include user input received during the modification and building process 503. For example, certain metadata 507 may be determined based on an automatic inspection of the mobile application code 501 and/or the executable created by the build 503. Additionally, metadata 507 may include user input information describing or relating to the mobile application, such as the application name, compatible OS versions. In some examples, metadata 507 may be used for advertising and publishing the application in an application store (e.g., enterprise application store 508). For instance, metadata 507 may include icons and screenshots for the application, HTML content describing the application and allowing for feedback and ratings of the application, so that the application may be published in an application store. Additionally, the metadata 507 may include one or more uniform resource locators (URLs) identifying a download location for the application in one or more application stores (e.g., public application store 506).

In certain embodiments, the executable binaries for the managed mobile application 505, and the metadata 507 associated with the application, may be provided to different application stores. For example, as shown in FIG. 5, the executable application may be sent to a public application store 506 (e.g., the APPLE APP STORE, the GOOGLE PLAY APP STORE, etc.), while the metadata 507 is sent to an enterprise application store 507. The enterprise application store 507 may be a non-public application store of a business or organization enterprise system. As discussed above, an enterprise application store 507 (e.g., application store 378) may be populated with enterprise applications by an application controller 374, including secure and enterprise-specific applications.

In some embodiments, both the executable binaries and the metadata for a managed mobile application may be provided to the same application store, which may be either a public application store 506 or enterprise application store 508. Additionally, multiple different versions of a single mobile application may be provided to an application store, for example, a native mobile application and a corresponding managed mobile application.

Referring now to FIG. 6, an example method is shown of generating a managed mobile application from a native application or a template application, and providing the managed mobile application and associated metadata to one or more application stores.

Steps 601-602 relate to embodiments in which a managed mobile application is created based on a native mobile application. A native mobile application may be, for example, an application developed by a company for use by employees via the company's enterprise infrastructure, or may be a consumer application developed by an independent software vendor (ISV). In step 601, a native mobile application which is to be rebuilt into a managed mobile application may be received by a command-line utility (e.g., as an argument), a wizard (e.g., identified by a user input), or other software tool 502. In certain examples, step 601 may be performed automatically by an online service during the development flow or publication flow of the native application. For instance, when a consumer mobile application or enterprise mobile application is published in an application store (e.g., public application store 506), an online service 502 may be invoked in the publication flow that is configured to generate a matching managed application for an enterprise system.

In step 602, the native mobile application received in step 601 may be modified by inserting code to allow the native mobile application to be controlled by an enterprise system. As described above regarding the modification and building process 503, a native application may be modified by opening the existing native application and inserting code to implement features, policies, and constraints that may allow the application to be executed as a managed application on a mobile device in an enterprise system. In order to insert the code, the software tool(s) 502 first may determine the structure of the native mobile application and the locations where code should be inserted. Application packages associated with certain mobile platforms may have specific predetermined structures which may be used to determine how and where the application may be opened to insert code. Some application packages also may be signed with a certificate and may have a provisioning profile to allow for management of the application. Thus, the determined application structure (based on the mobile platform requirements) and provisioning profile may allow the software tools 502 to open the native application and add code to make the desired modifications to the application. In order to modify the native application in step 602, the application files may be rewritten to add various functionality and features (e.g., code for monitoring and controlling system interactions, implementing policies, etc.) and inserting various assets into the code (e.g., certificates, secrets, resources to manage the application, etc.). After modifying the native application in step 602, the modified application may be re-built into a managed mobile application in step 606, discussed below.

Steps 603-605 relate to embodiments in which a template application is modified and configured to create a managed mobile application. In this example, rather than receiving and modifying an existing native application (as in steps 601-602), software tools 502 may be used to create a new managed application by modifying and configuring a template application. In step 603, a software tool 502 may receive user input identifying the general type of application that the user would like to create. For example, a general type of application may be a packaged web application, or an application hosted in an enterprise data center (e.g., an application that is accessed using the HDX/ICA or other display remoting protocol), or any other type of general application for which an application template (e.g., generic or stub application) may be created.

Various different software tools 502 may be used to receive the user input in step 603. For example, a command line utility 502 may accept an argument corresponding to the general type of application that the user would like to create, or a wizard 502 or other user interface may present users with the set of application template choices (e.g., via a drop down list) supported for creating a general application type. In other examples, the user need not select an application type, but instead may select one or more application features and/or capabilities desired for the new application, and the software tool 502 may determine the most appropriate application template to provide the features and capabilities selected by the user.

In step 604, a template application may be retrieved by the software tools 502, based on the application type identified in step 603. An application template, which may be a generic application or stub application, may include application code designed for a specific type of application (e.g., web applications, hosted enterprise applications, etc.) that may be easily configured, built, and deployed as a separate managed mobile application. For example, an application template may be single purpose application (e.g., a single tab web browser application, a single session hosted enterprise application, etc.) with the underlying code to execute as a managed mobile application, and with a set of default configuration parameters that may be changed to modify the functionality of the application. For example, the configuration parameters of an application template may define the features and functionality of the application (e.g., constraints and policies that may be implemented to control the application in an enterprise system), the look and feel of the application user interface (e.g., application skin, text, supported features, etc.), and data for publication of the application (e.g., application name, icon, etc.). Template applications may be designed and written so that such configuration parameters may be easily inserted and/or modified within the template by a software tool 502. As discussed below, in some examples, users may input configuration parameters as metadata which may be used to customize the template application into a tailored application suitable for the user's purpose.

Thus, a template application may be an input to a software tool 502 used to create a managed application 504. In some examples, the software tools 502 may correspond to a software toolkit 502 provided to organizations, ISV's, or other software application developers. In such cases, one or more template applications may be provided along with the software toolkit 502, or may be downloadable from a separate location. In other examples, template applications might not be directly available to developers, but may be available indirectly via a software tool 502 such as a command-line tool, wizard, or other user interface software tool. For example, a user may interact with a software wizard 502 to select a template application and provide metadata/configuration parameters, after which the software wizard 502 may retrieve and modify the underlying application template in accordance with the metadata/configuration parameters provided by the user.

A template application may be, for example, a web application template (or web browser template application). In some cases, a web application template may be a browser application stub, or may be a web browser application factored out into a binary SDK. Web application templates may be based on a native web browser application supported by a mobile platform, such as an iOS web browser or ANDROID web browser, and thus may include the traditional web browsing functionality. Web application templates also may include the code to be packaged as managed applications, so that the web browsing it supports may be performed using the security controls provided by an enterprise framework (e.g., network connectivity via micro VPN) to allow the web browser application to access Intranet resources as well as Internet resources.

In some examples, web application templates might not have the typical navigation controls, address bar, menus, or other user interface features used by web browsers, so that the web application generated from the template may have the look-and-feel of a customized application rather than a standard web browser. In various implementations of web application templates, various different user interface components (e.g., menus, navigation controls, scroll bars, etc.) may be included or not included in the template to provide different options for creating web applications.

As another example, a template application may be a hosted enterprise application template. A hosted enterprise application template may be based on a client execution environment application configured to provide a user interface for an application hosted in an enterprise data center. Hosted enterprise application templates may include, for example, the code from a client execution environment engine along with the user interface display controllers for the client execution environment session view. Applications generated from a hosted enterprise application template may be configured to access the enterprise data center using, for example, HDX/ICA display remoting protocols, and thus may be deployed through the gateway of an enterprise system (e.g., cloud gateway 406), just like other applications on the mobile device. In some examples, hosted enterprise application templates may be configured to operate only on a single session, rather than supporting multi-session applications, so that the hosted enterprise application generated from the template may have the look-and-feel of a single customized application.

In step 605, application configuration parameters are received to configure the template application retrieved in step 604. As discussed above, a template application may include basic underlying functionality (e.g., web browsing, connection and hosting from an enterprise data center, etc.), but might not include the specific content or configuration of the customized application desired by the user. Thus, in step 605, a software tool 502, such as a command-line tool, wizard, or other software tool, may receive user input specifying specific content or configuration parameters that may be used to customize the application template into the managed application to be deployed. The configuration parameters received in step 605 may be used to configure the functionality of the application (e.g., features, behaviors, etc.), customize the appearance of the application (e.g., customize the look-and-feel, provide a name and icon for publishing the application, etc.) and also to configure how the application will be managed/controlled within the enterprise system (e.g., security features, constraints and policies, etc.)

For web application templates, the application configuration parameters received in step 605 may be, for example, a name for the web application, an icon for publishing the web application, and a set of uniform resource locators (URLs) that define or limit the set of web pages/web resources for which the customized web application can be used. The set of URLs received to customize a web application may take the form of a URL list, or a set of base URL patterns input by the user via command-line arguments, a wizard, an input data file, or other user interface in step 605. The application configuration parameters received for a web application template also may include parameters for security/management policy control, such as whether the web application will be permitted to tunnel back through the network, whether the web application will support copy and paste functionality internally and between other applications, and a list of the mobile device hardware and facilities (e.g., the GPS system, microphone, or other sensors on the mobile device) to which the web application will have access.

In the example of a hosted enterprise application template, the application configuration parameters received in step 605 may include a name and icon for the application, a specific hosted enterprise application corresponding to the managed mobile application (e.g., when a customized single-session managed application is to be created), parameters corresponding to security/management policy controls for the hosted enterprise application, and parameters to configure the user interfaces of the hosted enterprise application. As in the examples above, configuration parameters may be received in step 605 as user input via command-line arguments, a wizard, an input data file, or other user interface in step 605.

In step 606, a managed mobile application is generated based either on (1) a modified native application (see steps 601-602), or a modified template application (see steps 603-605). In some examples, step 606 may be similar to the build process 503, discussed above. For instance, one or more executable binaries corresponding to the managed mobile application (e.g., .IPA files for APPLE mobile devices, .APK files for GOOGLE ANDROID mobile devices, etc.) may be generated in step 606, using compilation and build software tools, such as the XCODE suite for developing iOS applications.

In the case of modifying a native mobile application (steps 601-602), the building in step 606 may include rebuilding, resealing, and recertifying the application bundle. In some cases, the modified native application may be re-signed with a certificate that meets the requirements of the operating system on which the application is to be deployed, for example, the application package may be recertified with its original certificates (e.g., from an ISV, enterprise system customer, etc.) to allow the modified native application to be deployed. In the case of a managed application built from a template application (steps 603-605), the build process in step 606 may be similar and even easier in some cases. As discussed above, template applications may be designed so that configuration information input entered by the user in step 605 can easily be added into the application, for example, as entries in a configuration data file, to allow the application to be easily rebuilt and recertified.

In step 607, one or more metadata files associated with the managed mobile application may be generated. As discussed above, metadata files associated with a managed mobile application (e.g., XML files, text files, or other metadata formats) may include metadata describing the application. Certain metadata may be automatically derived during the processes of modifying and/or building the managed application (e.g., step 606), while other metadata may be received via user input during the configuration/modification processes (e.g., steps 602 and/or 605), or may be retrieved from external data sources in separate processes. Metadata may be used for several purposes, including advertising and publishing the application in an application store, providing links to current versions of application binaries, and providing information about the features and functionalities of the application, including information about the management and control of the application in an enterprise system. Thus, for advertising and publishing the application, the metadata files generated in step 607 may include the application name, icon, supported OS versions, general HTML descriptions and screenshots of the application, user ratings and comments, and the like. The metadata also may include one or more URLs to download the application binaries (e.g., from a public application store 506), allowing the managed application to be published/advertised in separate locations.

The metadata generated in step 607 also may include information about the control and management of the application in the enterprise system, such as the security features, constraints, and policies that will be applied to the managed application. Such metadata may include policies and constraints regarding data encryption, secure communication policies, access to device hardware and other resources, and any other security and application management functionalities described herein.

As discussed above, similar information regarding the control and management of the application in the enterprise system, including policies and restraints, also may inserted directly into the application code (e.g., steps 602 and/or 605) and built into the managed application (e.g., step 606). Thus, in some examples, this information might not be included in the metadata. In other cases, similar (or the same) information may be included in the metadata, so that the enterprise system may evaluate the metadata to ensure that the managed application is compatible with the enterprise gateway and the security/management policies of the system, before permitting the managed application to be downloaded and/or executed as a managed application on the enterprise system.

In other examples, certain application management and control information may be included in the metadata but need not be built into the executable binaries of the application. Some managed mobile applications may be built to include built-in application management support, but without certain specific parameters that configure and control the operation of the managed application, such as the specific set of URLs to which a managed web application is limited, the specific device hardware and features that a managed application may access, etc. In these examples, the specific configuration parameters may be included in the metadata, and the executable binaries of the application may be configured to retrieve this data from the metadata (e.g., from an enterprise application store) after the managed application is installed on a mobile device and first executed. In this way, a single managed application (e.g., in a public application store) may execute differently in different enterprise system infrastructures, depending on the configuration parameters in the corresponding metadata on the different enterprise systems.

In step 608, the managed mobile application may be provided to a public application store, and in step 609 the associated metadata may be provided to an enterprise application store. As described above in reference to FIG. 5, the managed mobile application in this example may include the executable binaries for the managed mobile application, which may be published by and distributed from a public application store, such as the APPLE APP STORE, the GOOGLE PLAY APP STORE, and/or other public application stores. The enterprise application store may correspond to a non-public application store within an enterprise system infrastructure under the control of a business or organization.

In the example shown in FIG. 6, the managed mobile application and the associated metadata are provided to different application stores. However, in other examples, both the managed mobile application (e.g., the executable binaries) and the associated metadata may be provided to the public application store and/or enterprise application store.

In some cases, a single uniform copy of a managed mobile application may be provided to a public application store, and various different versions of the associated metadata may be provided to different enterprise application stores. In such examples a different/custom copy of the metadata may be generated for each different enterprise system, allowing the different enterprise systems to provide their users (e.g., employees) with customized implementations of the managed mobile application based on the preferences of the specific enterprise system.

Referring now to FIG. 7, a diagram is shown illustrating an example process receiving and using a managed mobile application by a mobile device 703. As shown in this example, the mobile device 703 may download a managed mobile application from a first application store 701 (e.g., a public application store), and may download metadata associated with the managed mobile application from a second application store 702 (e.g., an enterprise application store). However, in other examples, both the managed mobile application and the associated metadata may be distributed by and downloaded from a single application store 701 or 702. Further, in some cases, the associated metadata need not be downloaded onto the mobile device 703. For instance the metadata may be accessed by the mobile device 703 only to determine a download URL for the managed mobile application, or might not be accessed at all by the mobile device 703. In other cases, the managed mobile application 704, after being downloaded to the mobile device 703, may be configured to retrieve the metadata from the enterprise application store 702.

In some embodiments, the metadata associated with the managed mobile application may be stored in a catalog 702a within the enterprise application store 702, along with the metadata for a number of other applications. For example, the catalog 702a in enterprise application store 702 may have metadata derived from a number of different applications, and users of mobile devices 703 in the enterprise system may log into the enterprise application store 702 to retrieve a list of the managed applications that are available/approved for the enterprise system. Prior to listing an application in a catalog 702a on an enterprise application store 702, the application may be evaluated by the enterprise system to ensure that it is compatible with the enterprise gateway, infrastructure, and/or the security and management policies of the enterprise system. Such evaluation may include, for example, access gateway integration testing. If an application is not compatible with the enterprise system in some respect, the system may determine that the application should not be listed in the catalog 702a, even though the application may be available for downloading via a public application store 701.

As discussed above, the metadata associated with a managed mobile application may include one or more URLs from which the application binaries may be downloaded. Therefore, in some cases, users of mobile devices 703 may log into the enterprise application store 702, and may use the application metadata to retrieve the application binaries 704 from the public application store 701. In this example, the enterprise application store 702 may automatically retrieve the application binaries 704 from the public application store 701, and provide them to the mobile device 703. Alternatively, the enterprise application store 702 may provide the URLs to the mobile device 703, and the mobile device 703 may connect to the public application store 701 to download the application 704. In either case, these processes may be transparent to users of mobile devices 703, so that it appears to the users that the application 704 is being downloaded solely from the enterprise store 702 without needing to access the public application store 701.

In other examples, users may log into the public application store 701 and download the application 704 without needing to first access the catalog 702a in the enterprise application store 702. Thus, users of mobile devices 703 need not have any interaction with or awareness of the enterprise application store 702. In some cases, after an application is downloaded from a public application store 701, the mobile device may automatically connect to the enterprise application store 702 (e.g., after the download of the application 704, or during the first execution of the application 704) to determine if the metadata associated with the application 704 is present in the catalog 702a, and to download the metadata if available.

When an application is updated in the public application store 701, for example, an updated version of a managed mobile application 704, the metadata in the catalog 702a may or may not also be updated. In some examples, the software tools 502 (e.g., a toolkit 502 for an ISV) may be designed with flexibility to allow ISVs and other developers to update the application in a public application store 701 without updating the corresponding metadata in the catalog 702a. In these examples, mobile devices 703 may download newer versions of the application binaries 704 directly from the public application store 701, and the new app version of the application should work correctly even though it may be associated with an enterprise account that has obsolete data in the catalog 702a.

In certain embodiments, mobile applications 704 that include built-in application management support, such as managed mobile applications generated using the techniques discussed above in reference to FIGS. 5-6, may be executed on the mobile device 703 in either a managed mode (i.e., in which the application behaves like a managed application) or an unmanaged mode (i.e., in which the application does not behave like a managed application). For example, managed mobile application 704 may execute in an unmanaged mode if an application management agent 705 is not installed on the mobile device 703, and/or if the mobile device user has not logged into the enterprise application store 702 and enrolled the application 704. Thus, users may download managed mobile applications 704 to their devices 703 and run these applications, even if an application management agent 705 is not present or if the user/mobile device 703 has not received the proper authorization to run the application 704 from the enterprise system (e.g., application management agent 705 and/or enterprise gateway). In contrast, if the application 704 is a published and enrolled application associated with the enterprise application store 702, the application 704 may be executed in a managed mode, and may behave like a managed application on the mobile device 703.

Additionally, certain enterprise systems may provide dual-mode support for managed mobile applications 704. When dual-mode support is provided, an application may initially run in a first mode (e.g., managed or unmanaged), and subsequently run in a second mode (e.g., managed or unmanaged) in response to a request by the mobile device user and/or based on certain conditions. For example, an application 704 initially running in unmanaged mode may begin running in managed mode after an application management agent 705 is installed on the mobile device 703, the user logs into the enterprise store 702, and subscribes to the application 704. At this point, the application 704 is associated with the enterprise account of the user/mobile device 703, and the application 704 will behave like a managed application. Using this approach, certain application developers (e.g., ISVs and other third-party application developers) may choose to upload two versions of their application (e.g., a personal version and an enterprise version), or may choose to upload a single integrated version of their application. In certain embodiments, applications 704 may only be permitted to transition from unmanaged mode to managed mode, and not from managed mode to unmanaged mode. In other examples, applications 704 may transition both directions.

With respect to dual-mode support for managed mobile applications 704, in certain examples, multiple different application types may be supported to control certain behaviors of the applications 704 in managed mode and unmanaged mode. In some cases, application types for dual-mode support may be determined when the managed mobile application is generated (e.g., modified and re-built) using the techniques discussed above in reference to FIGS. 5-6. For instance, one or more software tools 502 configured to modify and rebuild a mobile application may be configured to accept an application type input (e.g., as a command-line argument or input into a wizard, data file, or other user interface, etc.). In some examples, a software toolkit 502 provided to ISVs and other application developers may include an API allowing the ISV or developer to define an application type for the managed mobile application to be generated.

Application types for dual-mode support may govern various features of execution in managed mode and unmanaged mode, as well as the conditions and requirements for applications to transition between modes. For example, certain application types may be designed to specifically target enterprise users, and developers may prefer that these applications run in managed mode. Applications of this type may be permitted to run in an unmanaged mode before they are associated with an enterprise account, but when running in an unmanaged mode the applications may run with a set of default management policies defined by the developer (e.g., ISV) in a template file. Thus, ISVs and other developers may control the behavior of the certain applications, by setting an application type and configuring default management policies, without any association between the application and an enterprise account. In contrast, other types of applications may be permitted to run in unmanaged mode without any default management policies.

As another example, an application type relating to dual-mode support may require that the mobile device user provides a manual confirmation (e.g., via a dialog box or other user prompt) before the application 704 is transitioned from unmanaged mode to managed mode. In this example, a dialog box or other prompt may be provided to the user only after all of the other conditions of transition from unmanaged to managed have been satisfied (e.g., the application management agent 705 is present on the mobile device 703, an enterprise account was logged into at least once from the application management agent 705, the application 704 is entitled to the user from the enterprise account, and/or the user has subscribed to the application 704). In this case, only if the user confirms will the application 704 be transitioned from unmanaged mode to managed mode, even if all of the other conditions are met. In contrast, other types of applications may be automatically transitioned from unmanaged mode to managed mode without needing a confirmation by the user. In additional examples, application types relating to dual-mode may require that an application 704 run in a specific mode (e.g., unmanaged or managed), or may set the conditions that govern when an application is transitioned between modes.

As discussed above, a managed mobile application 704 may be downloaded to a mobile device 703 via an enterprise application store 702 or directly from a public application store 701. Further, certain managed mobile applications 704 may execute with or without the presence of an application management agent 705 and/or other enterprise infrastructure. Additionally, multiple execution modes may be supported (e.g., managed and unmanaged), and application types and corresponding rules may be implemented to control the execution behavior of the application 704 based on various conditions. Although discussed separately above, these concepts may operate in combination in many scenarios. The examples below further illustrate these concepts in combination for the first time execution of a managed mobile application 704 on a mobile device 703.

In certain examples, the mobile device user may install and log onto the application management agent 705 before downloading the managed mobile application 704 (e.g., via the public application store 701 using the user's personal account). In such cases, the user may log onto the application management agent 705 to subscribe to and download the managed mobile application 704 from the public application store 701, and then launch the application 704. In this example, the application 704 may initiate a handshaking protocol and authentication handshaking process with the application management agent 705 to establish secure inter-process communication (IPC). During execution, the application 704 may flip to the application management agent when the mobile device user is required to enter credentials to log into the application management agent 705.

In other examples, the mobile device user may download managed mobile application 704 from the public application store 701 before installing and/or logging onto the application management agent 705. For example, if the user installs and launches a managed mobile application 704 before the application management agent 705 is installed on the mobile device 703, then then managed mobile application 704 may run in unmanaged mode, as discussed above.

In still other examples, if the user launches the managed mobile application 704 for the first time after the application management agent 705 is installed on the mobile device 703, but before the user has logged onto the application management agent, the managed mobile application 704 may be configured to detect that application management agent 705 is installed on the mobile device 703 and automatically start the application management agent 705. After the application management agent 705 is started and the user logs in with an enterprise account, the application management agent 705 may be configured to enumerate the user's subscribed applications in the enterprise application store 702. In this case, the application 704 may be configured to check the set of applications enumerated by the application management agent 705. If the application 704 is subscribed, the application 704 may launch in managed mode, and if the application 704 is not subscribed, the application 704 may launch in unmanaged mode. In additional examples, as discussed above, the application 704 may prompt the user for a confirmation before transitioning from unmanaged to managed mode.

Figure 8:
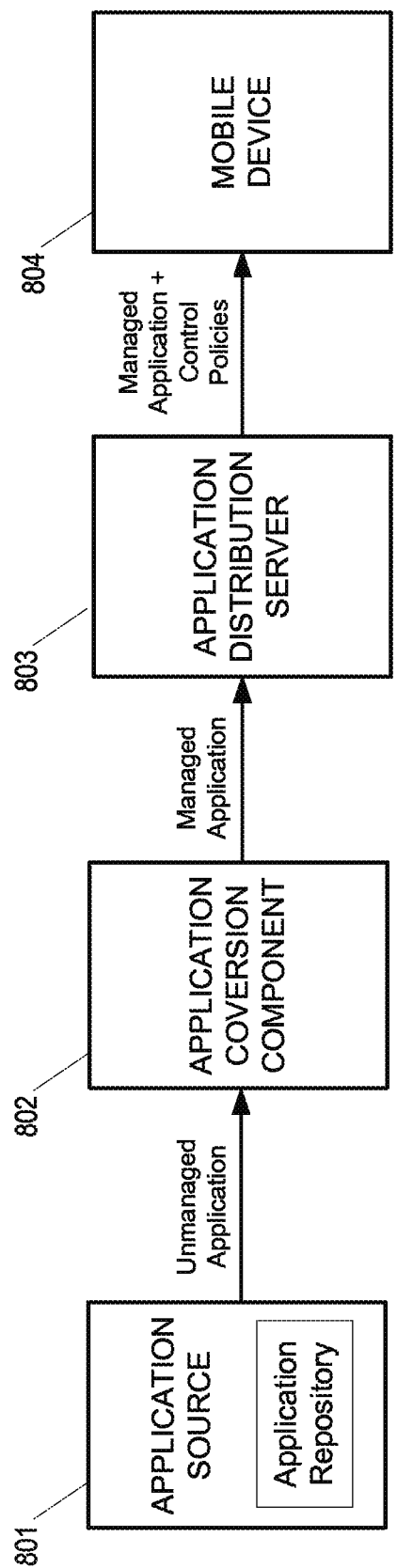
FIGS. 8 and 9 are diagrams showing example computing environments and processes of providing managed mobile applications to mobile devices, in accordance with one or more illustrative aspects described herein.
Figure 9:
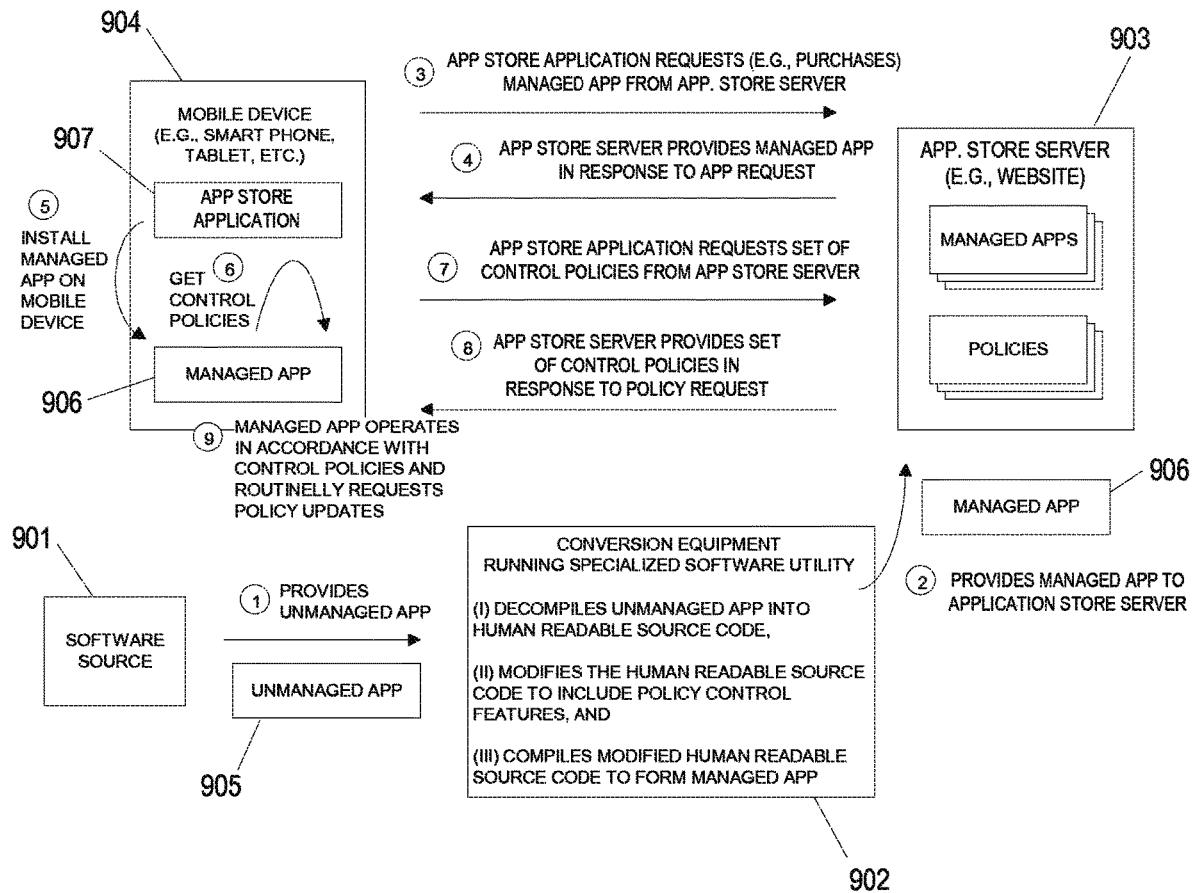

Policy-Based Control of a Managed Application Derived from an Unmanaged Application FIGS. 8 and 9, and the sections below, illustrate various embodiments and examples relating to policy-based control of a managed application derived from an unmanaged application. As in the examples above, some examples of managed applications are described in reference to mobile applications for devices, such as mobile phones, personal digital assistants (PDAs), tablet, and laptop computers. For example, FIGS. 8-9 illustrate example processes in which an unmanaged mobile application is received from an application source 801 or 901, and converted into a managed mobile application via application conversion component 802 or 902. The managed mobile application may then be provided to an application distribution server 803 or 903, from which it may be downloaded by a mobile device 804 or 904. However, it should be understood that the concepts described herein are not limited to mobile applications and mobile devices, but may be applied to other types of computing devices as well. For example, managed software applications may be developed for and distributed to personal desktop computers and other non-mobile computing devices, using similar (or the same) techniques described below for mobile applications and mobile devices. Managed applications also may be developed for and distributed to devices on other software platforms, such as television-based platforms (e.g., ANDROID applications for GOOGLE TV, etc.), automobile-based or vehicle-based software platforms, and the like, using similar or the same techniques described below for mobile applications and mobile devices (e.g., software development and modification tools, distribution via application stores, etc.).

Referring to FIG. 8, a diagram is shown illustrating an example computing environment and example process of providing a managed mobile application to a mobile device 804. As shown in this example, an application source 801, such as a public application store, an enterprise application store, a software developer, etc., may include a repository of unmanaged apps (e.g., applications which are not under local policy control).

An application conversion component 802 may receive an unmanaged application from the application source 801, decompile the unmanaged application, augment the unmanaged application with a set of instructions that impose control based on a set of policies, and then recompile the unmanaged application to form a managed application. The managed application then may be offered through an application source (e.g., the same application source 801 or a different application store, or an application distribution server 803 such as an enterprise application server, etc.) for use by mobile device 804.

Once the managed application is installed on the mobile device 804, the managed application may access, and may operate in accordance with, a set of policies which are separately maintained on the mobile device 804. Additionally, the managed application may request an updated set of policies from the application source (e.g., application source 801, application distribution server 803, etc.) and operate in accordance with the updated set of policies over time and in a routine manner.

Referring to FIG. 9, a diagram is shown illustrating another example computing environment and example processes of providing a managed mobile application to a mobile device 904. In this example, the electronic environment shown in FIG. 9 includes an application source 901, a software converting equipment running a specialized software utility 902, an application store server 903, and a mobile device 904 (e.g., a smart phone, a tablet, etc.).

In FIGS. 8 and 9, although the application sources 801 and 901, converting components 802 and 902, and application distribution servers 803 and 903 are shown as separate apparatuses in these examples, it should be understood that any two or all three of these may be implemented as the same apparatus in various examples. For instance, in some arrangements, users of mobile devices 904 may purchase managed applications from an application store server 903, which operates as both a vehicle for distributing the managed applications as well as a policy server for distributing policies which control how the managed applications operate on the mobile devices 904.

Additionally, it should be understood that the various apparatuses of the computing environments shown herein may be computerized and communicate via electronic signals. For example, each computerized apparatus 801-804 and 901-904 may include a communications interface to connect to a communications medium such as a computer network, memory to cache and/or persistently store information, and processing circuitry to execute an operating system and local applications, including some or all of the components discussed above in reference to FIGS. 1 and 2.

Referring again to FIG. 9, during operation, the conversion equipment 902 may run a specialized software utility which receives an unmanaged application 905 from a software source 901 (see step 1). The conversion equipment 902, when running in accordance with the specialized software utility, may decompile the unmanaged application 905, for example, into human-readable source code. Then, the conversion equipment 902 may modify the source code to include (e.g., embed) various policy control features. For example, the conversion equipment 902 may be constructed and arranged to analyze (e.g., scan and identify) activities and appropriate locations to inject policy-based control instructions into the software source code of the unmanaged application. The conversion equipment 902 may then recompile the source code to form a managed application 906.

In this example, the application store server 903 may receive and load managed applications from the conversion equipment 902 (see step 2), thereby making the managed application available for distribution to consumer devices via the application store server 903. In some cases, an administrator may provide policies which control the operation of the managed applications 906, and such policies may be stored on and made available for distribution via the application store server 903.

In certain embodiments, a user of mobile device 904 may browse applications offered by the application store server 903 via a client application 907 (e.g., an application store application) installed on the mobile device 904. For example, when a user of a mobile device 904 wishes to acquire a managed application (e.g., purchase, or via a free download), the user may direct an application store client application 907 on the mobile device 904 to request the managed application (see step 3). The application store server 903 may respond to the application request by providing the managed application to the mobile device 904 (see step 4). The mobile device user may then install the managed application on the mobile device 904 (see step 5). Such installation may be automatically triggered by the application store application 907, for example, the application store application 907 may automatically direct the operating system of the mobile device 904 to install the managed application. In other examples, the installation of the managed application may be manually coordinated by the user of the mobile device 904.

When the user initially invokes the managed application 906 installed on the mobile device 904, the managed application 906 may communicate with the application store application 907 to obtain a set of policies (see step 6). In some examples, the set of policies may be provided to the application store application 907 from the application store server 903 during the purchase and/or download of the managed application 906. In other cases, the control policies might not initially be present on the mobile device 904. In such cases, the application store application 907 may send a policy request to the application store server 903 to obtain the set of policies (see step 7). In response to the policy request, the application store server 903 may provide the set of policies to the mobile device (see step 8). In various examples, the set of control policies and the managed application 906 may be separate software constructs or may be combined into a single software object.

After the managed application 906 and the control policies are available to (e.g., installed on) the mobile device 904, the managed application may be run in accordance with the set of control policies, enabling the mobile device user to perform useful work (see step 9). In some examples, the set of control policies may dictate one or more times in which the managed application 906 will be configured to request an updated set of control policies. For instance, the set of control policies may direct the managed application 906 to obtain a new set of control policies daily, every two or three days, every week, every month, etc. When the managed application 906 requires a new set of control policies, the managed application 906 may signal the application store application 907 to retrieve the new set of policies from the application store server 903 (see step 6 again). That is, the application store application 907 may operate as a proxy to obtain new sets of control policies from the application store server 903 on behalf of the managed application 906. In some cases, the mobile device 904 may be configured to install and run multiple managed applications 906. In such cases, the same application store application 907 may be configured to communicate with the application store server 903 on behalf of each managed application 906a-n, or different application store applications 907 may be installed on the mobile device 904 corresponding to each managed application 906a-n.

Certain embodiments illustrating policy-based control of a managed application derived from an unmanaged application may include various methods of generating a managed application 906 from an unmanaged application 905. Such embodiments may include receiving, by one or more computing devices and/or processing circuitry, an unmanaged application 905 from an application source 901, the unmanaged application 905 being constructed and arranged to execute on a mobile device. These embodiments may further include decompiling, by the computing devices and/or processing circuitry, the unmanaged application 905 into unmanaged (e.g., readable and/or editable) source code. Such embodiments may further include adding, by the computing devices and/or processing circuitry, a set of policy-based control instructions to the unmanaged source code to form managed source code, wherein the set of policy-based control instructions may be constructed and arranged to provide policy-based control. Such embodiments may further include compiling, by the computing devices and/or processing circuitry, the managed source code to form a managed application 906 which, when executed on a mobile device 904, may be configured to access and operate in accordance with a set of policies that may be separately stored on the mobile device 904.

Examples of computing devices and/or processing circuitry upon which various embodiments may be performed include particular hardware and/or various software development platforms, such as servers, general purpose computers, client workstations, and so on, including some or all of the components discussed above in reference to FIGS. 1-2. Such platforms may be equipped with various software development tools including, for example, compilers, linkers, libraries, editors, debuggers, other runtime environment and test utilities, and so on.

Certain additional embodiments illustrating policy-based control of a managed application derived from an unmanaged application may include various methods of operating mobile electronic devices (e.g., smartphone, laptop, tablet computer, etc.). Such embodiments may include receiving, using the hardware and/or software of a mobile device 904, a managed application 906 from an application server 903 during a first communication, the managed application 906 being constructed and arranged to access and operate in accordance with a set of control policies. Such embodiments may further include receiving, by the mobile device 904, a set of control policies from the application server 903 during a second communication different than the first communication, wherein the set of control policies may be stored on the mobile device 904 separately from the managed application 906. Such embodiments may further include running, by the mobile device 904, the managed application 906, which may be accessed and operated in accordance with the set of control policies stored on the mobile device 904 separately from the managed application 906.

Other various embodiments illustrating policy-based control of a managed application derived from an unmanaged application may be directed to electronic systems and apparatuses, processing circuits, computing environments, computer program products, and so on. Certain embodiments may directed to various processes, electronic components and circuitry which are involved in generating, deploying and operating managed applications derived from unmanaged applications.

As discussed above, mobile devices 904 may allow users to purchase and download applications for their devices 904 from an external web site or service, which may be referred to as an application store server 903. An application configured to communicate with an application store server 903 and/or browse application store services may be an application store application 907. In some cases, the application store application 907 may be configured to download and install a managed application 906, and then may cease management of that application. Ongoing conditions, such as loss of entitlement to the application, or changes to the allowed uses of the application, may or may not be maintained or enforced. Thus, in some cases, once the managed application 906 is installed on a mobile device 904, the enterprise or organization that distributed it may lose the ability to control access to the managed application 906.

Certain advantages may be realized from various embodiments of policy-based control of a managed application derived from an unmanaged application. For example, company employees, customers, or other organization members may prefer to use their own devices, and might not want to enroll their devices in a Mobile Device Management (MDM) system service. Various techniques discussed herein provide a means by which a company or other organization may add management to applications and distribute those applications to unmanaged devices, such as mobile devices 904 or company employees, customers, or organization members.

Additional embodiments and techniques may include systems and/or methods for adding management to applications that are to be distributed to unmanaged devices, such as mobile devices 904. Such systems may include an application running on a mobile device 904 that acts as an application store application 907 for downloading and installing other applications from one or more sites or services acting as an application store (e.g., application store server 903). Such systems may further include a software utility configured to takes as an input an unmanaged application 905 and output the same application with additional management software added as a managed application 906. Such systems also may include a set of security policies and/or rules that control how the managed application 906 is expected to operate on the mobile device 904.

Additional embodiments and techniques may include methods involving generating a managed application 906 by submitting an unmanaged application 905 to a hardware and/or software utility, such as application conversion component 802 or conversion equipment 902. Such embodiments may include the software utility decompiling the original application into byte code or readable source code, and further may include modifying the byte code or readable source code by injecting various management software and components. Such examples may include recompiling the modified application into a new and managed version of the application 906, and may further include providing the managed application 906 to an application distribution server (e.g., application store server 903) and making the managed application 906 available for downloading and installing by a client application (e.g., application store application 907) running on the mobile device 904. Such examples may further include the managed application 906 periodically contacting the application store application 907 to confirm entitlement and to refresh security policies.

Various embodiments may include techniques for an organization (e.g., an enterprise) to provide managed applications to unmanaged devices, such as employee or customer mobile devices 904, without requiring the devices to be enrolled into Mobile Device Management Systems. Embodiments described herein provide techniques by which an organization may distribute and control access to specific applications and data on mobile devices that are not under the direct control of the organization, even if those applications were originally written without management software included. Accordingly, some embodiments may include one or more software utilities configured to dynamically inject management code into existing unmanaged applications. Thus, even software applications that were originally developed without any management software may potentially be added to lists of managed applications used by enterprises and other organizations.

Additionally, in some examples, an application store application 907 may act as an authentication and security policy management application, thereby allowing for management of specific applications on unmanaged devices. Thus, rather than performing device management by enrolling the entire device into a management system, or rewriting unmanaged applications with specific management components added as part of the core design of the application, various examples described herein may allow managed application control to be imposed and dynamically updated via policies which are deployed locally to the mobile devices to direct and control the operation of the managed applications.

Figure 10:
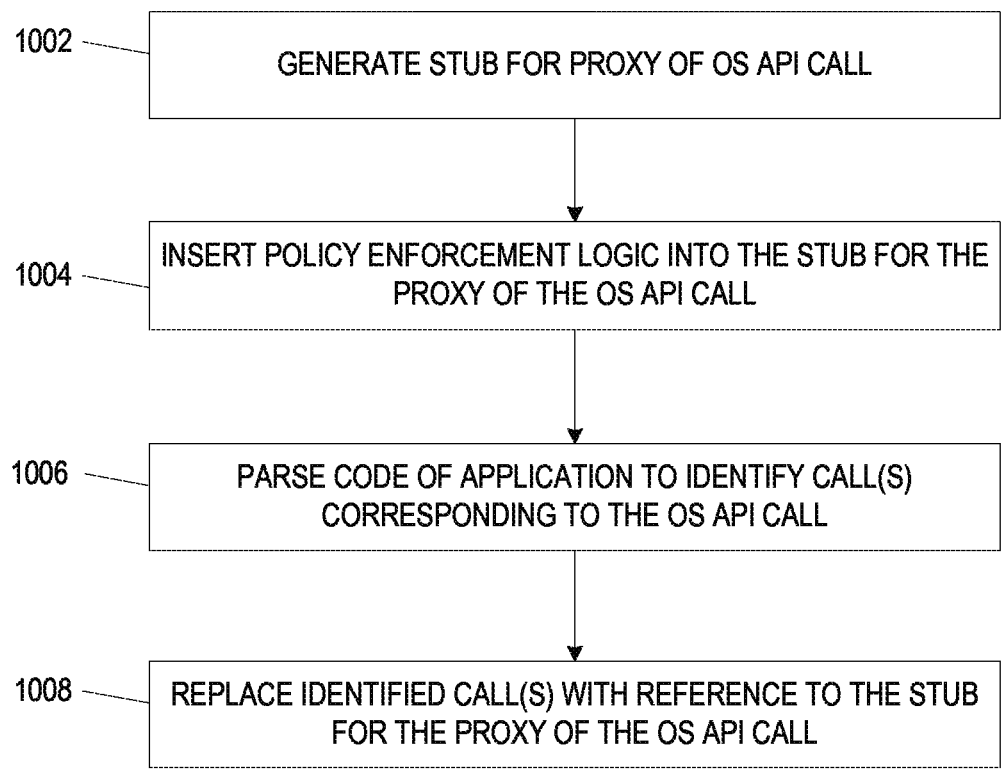
FIG. 10 is a flow diagram illustrating an example process for wrapping an application for an application management framework, in accordance with one or more illustrative aspects described herein.

FIG. 10 is a flow diagram illustrating an example process for wrapping an application for an application management framework, in accordance with one or more illustrative aspects described herein. Referring to FIG. 10, at step 1002, a stub for a proxy of an OS API call may be generated. In some embodiments, the OS API call may be a call to a method of the OS API and the proxy of the OS API call may include a call corresponding to the method of the OS API. For example, Tables T1 and T2 depict illustrative pseudo code for non-static and static ANDROID API method calls, respectively.

TABLE T1 public retType method (paramTypes)
public static retType method(Object instance, paramTypes)
{
    return ((androidclass)instance).method( );
}

TABLE T2 public static retType method (paramTypes)
public static retType method(Object instance, paramTypes)
{
    return androidclass. method( );
}

In some embodiments, the OS API call may be a call to a class of the OS API. In such embodiments, the proxy of the OS API call may include a call to a class that extends the class of the OS API. For example, Table T3 depicts illustrative pseudo code for a class that extends a class of the ANDROID API.

TABLE T3 public class ActivityStub extends android.app.Activity
{
    protected void onCreate(Bundle paramBundle)
    {
        ctx_onCreate(paramBundle);
    }
    public void super_ctx_onCreate(Bundle paramBundle)
    {
        super.onCreate(paramBundle);
    }
    protected void ctx_onCreate(Bundle paramBundle)
    {
        super.onCreate(paramBundle);
    }
    public void startActivity(Intent paramIntent, Bundle paramBundle)
    {
        super.startActivity(paramIntent, paramBundle);
    }
}

A class associated with an application may have its superclass name changed to the name of the class that extends the class of the OS API, and any associated method may be renamed. For example, Table T4 depicts illustrative pseudo code for renaming a class associated with an application to the class illustrated by Table T3.

TABLE T4 public class MyActivity extends ActivityStub
{
    protected void ctx_onCreate(Bundle paramBundle)
    {
        // developer code
    }
}

At step 1004, policy enforcement logic may be inserted into the stub for the proxy of the OS API call. For example, an aspect-oriented programming (AOP) extension (e.g., AspectJ) may be used to create and/or insert the policy enforcement logic. Table T5 depicts illustrative pseudo code for policy enforcement logic and Table T6 depicts illustrative pseudo code for a wrapped method in an application subclass.

TABLE T5

```
public void featureMethod(. . .)
{
    if(featurePolicyBlocked)
        return;
    ((android.featureMethod)paramObject).featureMethod(. .);
}
```

TABLE T6

```
protected void onCreate(Bundle bundle)
{
    if(wrapMethod)
    {
        //skip developer code by calling the super method
        super_ctx_onCreate(bundle);
        return;
    }
    ctx_onCreate(bundle);
}
```

As indicated above, in some embodiments, the OS API call may be a call to a method of the OS API, and the proxy for the OS API call may include a call corresponding to the method of the OS API. In such embodiments, the policy enforcement logic may include one or more conditions for determining whether the call corresponding to the method of the OS API should be invoked. The stub for the proxy of the OS API call may have a return type corresponding to a return type of the OS API call and/or the stub for the proxy of the OS API call may have one or more parameters corresponding to parameters of the OS API call. If the application invokes the reference to the stub for the proxy of the OS API call, a value for each of the one or more parameters corresponding to the parameters of the OS API call may be received from the application, and a device running the OS and the application (e.g., mobile device 904) may execute the policy enforcement logic to determine whether the call corresponding to the method of the OS API should be invoked. In response to determining that the call corresponding to the method of the OS API should be invoked, the call corresponding to the method of the OS API may be invoked, the value for each of the one or more parameters corresponding to parameters of the OS API call may be passed to the method of the OS API, and a value of the return type of the OS API call may be received from the method of the OS API. This value may be returned to the application by the proxy of the OS API call. In response to determining that the call corresponding to the method of the OS API should not be invoked, the call corresponding to the method of the OS API may fail to be invoked, the value for each of the one or more parameters corresponding to parameters of the OS API call may fail to be passed to the method of the OS API, and a predetermined value of the return type of the OS API call may be returned to the application by the proxy of the OS API call.

Additionally or alternatively, the OS API call may be a call to a class of the OS API, and the proxy of the OS API call may include a call to a class that extends the class of the OS API. In such embodiments, if the application invokes the reference to the stub for the proxy of the OS API call, an instance of the class that extends the class of the OS API may be instantiated. The instance of the class that extends the class of the OS API may include an instance of the class of the OS API and the policy enforcement logic. The policy enforcement logic may include one or more conditions for determining whether a call to a method of the instance of the class of the OS API should be invoked. A device running the OS and the application (e.g., mobile device 904) may execute the policy enforcement logic to determine whether the call to the method of the instance of the class of the OS API should be invoked. In response to determining that the call to the method of the instance of the class of the OS API should be invoked, the method of the instance of the class of the OS API may be invoked. In response to determining that the call to the method of the instance of the class of the OS API should not be invoked, the method of the instance of the class of the OS API may fail to be invoked.

In some embodiments, the application may invoke one or more calls to the OS API that trigger one or more operations of the OS API. In such embodiments, the one or more calls to the API may be identified via the class that extends the class of the OS API. At runtime, the class that extends the class of the OS API may implement the functionality of the one or operations of the OS API or proxies thereof, subject to the policy enforcement logic. For example, Table T7 depicts illustrative pseudo code for implementing a proxy of an operation of an OS API.

TABLE T7

```
Public Object getSystemService(String service)
{
    Object serviceObject = super.getSystemService(service);
    return proxywrapper(serviceObject);
}
```

As illustrated by Table T7, a proxy of a service object may be returned. The policy enforcement logic may thus be utilized to determine whether to forward or ignore calls to the underlying (or "real") service object.

In some embodiments, the class that extends the class of the OS API may include one or more calls to a method or methods that are not available in earlier versions of the OS. In such embodiments, a "dummy" or "placeholder" class may be included to prevent the class loader from throwing a class not found exception in response to encountering the one or more calls. Table T8 depicts illustrative pseudo code for such a "dummy" or "placeholder" class (e.g., for an onActionMode call in ANDROID).

TABLE T8

```
class citrixSuper.android.app.Activity{
public void onActionModeFinished (ActionMode mode)
{
//..
}
}
class android.view.ActionMode{
//empty
}
```

In some embodiments, the policy enforcement logic may include one or more calls to a policy enforcement class that includes one or more methods for determining whether a call by the application to the OS API should be invoked. The method(s) for determining whether the call by the application to the OS API should be invoked may include a method for determining whether a call by the application to the OS API for cutting, copying, or pasting data to or from a clipboard of the OS should be invoked. Additionally or alternatively, the method(s) for determining whether the call by the application to the OS API should be invoked may include a method for determining whether a call by the application to the OS API for browsing to a specified uniform resource locator (URL) should be invoked, a method for determining whether a call by the application to the OS API for geographical location information accessible to the OS, camera data accessible to the OS, or microphone data accessible to the OS should be invoked, and/or a method for determining whether a call by the application to the OS API for composing an email message or a short messaging service (SMS) message should be invoked.

At step 1006, code of an application may be parsed to identify one or more calls corresponding to the OS API call. In some embodiments, the code of the application may comprise bytecode of the application configured for execution by a process virtual machine run on the OS (e.g., ANDROID's DALVIK), and parsing the code of the application to identify the one or more calls corresponding to the OS API call may include parsing the bytecode of the application to identify one or more portions of bytecode of the application that correspond to the OS API call. At step 1008, the one or more calls corresponding to the OS API call may be replaced with a reference to the stub for the proxy of the OS API call. In some embodiments, at least a portion of the code of the application (e.g., bytecode of the application) may be merged with code (e.g., bytecode) comprising the policy enforcement logic into a common file.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described and/or illustrated herein may be performed in other than the recited order, and that one or more steps illustrated may be optional in accordance with aspects of the disclosure. Modifications may be made, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the aspects described herein.

What is claimed is:

1. A method comprising:
    inserting, by a computing system, code into an application, wherein the application is available from a public application store, and wherein the code, when executed, causes the application to operate in accordance with one or more policies associated with an application-management framework; and
    provisioning, by the computing system, an enterprise application store that is associated with the application-management framework, wherein the enterprise application store makes the application, with the code inserted, available for download as a managed application for the application-management framework.

2. The method of claim 1, wherein the code, when executed, enables the application-management framework to control invocation of an application programming interface (API) call for a function of an operating system.

3. The method of claim 2, further comprising:
    prompting a user to input additional information regarding use of the function within the application-management framework; and
    generating, based on the additional information, the code.

4. The method of claim 2, wherein the function comprises at least one of the following:
    cutting, copying, or pasting data to or from a clipboard of the operating system,
    browsing based on a specified uniform resource locator (URL),
    accessing geographical location information, camera data, or microphone data accessible to the operating system, or
    composing an email or short messaging service (SMS) message.

5. The method of claim 1, wherein provisioning the enterprise application store is performed by provisioning the enterprise application store with data identifying the application and the public application store.

6. A system comprising:
    at least one processor; and
    a memory comprising instructions that when executed by the at least one processor cause the system to:
        insert code into an application, wherein the application is available from a public application store, and wherein the code, when executed, causes the application to operate in accordance with one or more policies associated with an application-management framework; and
        provision an enterprise application store that is associated with the application-management framework, wherein the enterprise application store makes the application, with the code inserted, available for download as a managed application for the application-management framework.

7. The system of claim 6, wherein the code, when executed, enables the application-management framework to control invocation of an application programming interface (API) call for a function of an operating system.

8. The system of claim 7, wherein the instructions, when executed by the at least one processor, cause the system to:
    prompt a user to input additional information regarding use of the function within the application-management framework; and
    generate, based on the additional information, the code.

9. The system of claim 7, wherein the function comprises at least one of the following:
    cutting, copying, or pasting data to or from a clipboard of the operating system,
    browsing based on a specified uniform resource locator (URL),
    accessing geographical location information, camera data, or microphone data accessible to the operating system, or
    composing an email or short messaging service (SMS) message.

10. The system of claim 6, wherein the instructions that, when executed by the at least one processor, cause the system to provision the enterprise application store by provisioning the enterprise application store with data identifying the application and the public application store.

11. One or more non-transitory computer-readable media comprising instructions that, when executed by one or more computers, cause the one or more computers to:

insert code into an application, wherein the application is available from a public application store, and wherein the code, when executed, causes the application to operate in accordance with one or more policies associated with an application-management framework; and provision an enterprise application store that is associated with the application-management framework, wherein the enterprise application store makes the application, with the code inserted, available for download as a managed application for the application-management framework.

12. The one or more non-transitory computer-readable media of claim 11, wherein the code, when executed, enables the application-management framework to control invocation of an application programming interface (API) call for a function of an operating system.

13. The one or more non-transitory computer-readable media of claim 12, wherein the instructions, when executed by the one or more computers, cause the one or more computers to:

prompt a user to input additional information regarding use of the function within the application-management framework; and generate, based on the additional information, the code.

14. The one or more non-transitory computer-readable media of claim 11, wherein the instructions that, when executed by the one or more computers, cause the one or more computers to provision the enterprise application store by provisioning the enterprise application store with data identifying the application and the public application store.

15. A method comprising:

generating, by a computing device, a managed application based on:

receiving a native mobile application;

determining, based on a structure of the native mobile application, one or more locations within the native mobile application;

inserting, based on the one or more locations within the native mobile application, code into the native mobile application, wherein the code, when executed, causes the native mobile application to operate in accordance with one or more policies associated with an enterprise; and building, after the inserting, the native mobile application into the managed application;

generating, by the computing device, metadata associated with the managed application based on:

using a software tool to automatically derive first information from the native mobile application;

receiving, via a user interface, user input that indicates second information regarding the native mobile application; and generating, based on the first information and the second information, the metadata; and providing, by the computing device and to one or more application stores, the managed application and the metadata to enable the managed application for download to one or more mobile devices.

16. The method of claim 15, wherein the code, when executed, enables an application-management framework to control invocation of an application programming interface (API) call for a function of an operating system, wherein the application-management framework is configured on the one or more mobile devices.

17. The method of claim 16, wherein the function comprises at least one of the following:

cutting, copying, or pasting data to or from a clipboard of the operating system, browsing based on a specified uniform resource locator (URL), accessing geographical location information, camera data, or microphone data accessible to the operating system, or composing an email or short messaging service (SMS) message.

18. The method of claim 15, wherein the one or more policies are enforced by an enterprise-management framework configured on the one or more mobile devices.

* * * * *